United States Patent [19]

Sander et al.

[11] Patent Number: 5,047,967
[45] Date of Patent: Sep. 10, 1991

[54] DIGITAL FRONT END FOR TIME MEASUREMENT AND GENERATION OF ELECTRICAL SIGNALS

[75] Inventors: Wendell Sander, Los Gatos; Brian Sander, Boulder Creek, both of Calif.

[73] Assignee: Apple Computer, Inc., Cupertino, Calif.

[21] Appl. No.: 382,171

[22] Filed: Jul. 19, 1989

[51] Int. Cl.$^5$ .............................................. G06F 15/20
[52] U.S. Cl. .................... 364/569; 364/270.2; 364/950
[58] Field of Search ............ 364/569, 900, 200, 270.2, 364/950; 328/155; 375/119, 120

[56] References Cited

U.S. PATENT DOCUMENTS

| | | | |
|---|---|---|---|
| 3,809,884 | 5/1974 | Nibby et al. | 364/200 |
| 4,449,183 | 5/1984 | Flahive et al. | 364/200 |
| 4,617,679 | 10/1986 | Brooks | 375/119 |
| 4,736,336 | 4/1988 | Girard | 364/900 |
| 4,878,028 | 10/1989 | Wang et al. | 328/155 |

Primary Examiner—Parshotam S. Lall
Assistant Examiner—Ellis B. Ramirez
Attorney, Agent, or Firm—Blakely, Sokoloff, Taylor & Zafman

[57] ABSTRACT

An integrated circuit cell module for performing precise time measurements for use in applications such as disk drive controllers. The combination of the cell module and a hard disk controller chip creates a complete hard disk controller in a single chip without the need for external analog components normally required for classic phase lock loop hard disk controllers. A problem in designing such a unified chip is that it must be digital in nature. Therefore, the maximum resolution with which signals generated by the disk drive (Rddata signals) can be measured and signals generated by the controller for writing to disk (Wrdata signals) can be generated is dependent on the clock which drives the controller chip. In hard disk controllers, the data rate is such that the minimum distance between adjacent Rddata or Wrdata pulses is approximately 100 ns which would require an oscillator having a speed which would be impractical in a design. This problem is solved using standard CMOS gates to measure the distance between a reference clock and the Rddata pulse to 2 ns. accuracy. This measurement is provided as a binary number to the hard disk controller which uses this information along with the measurement for an adjacent pulse to determine the distance between adjacent pulses (cell time) to within 2 ns. For generating Wrdata pulses, a binary number is input which defines the distance to be delayed from the reference clock. This delay can be any multiple of 4 ns. over the period of the reference clock. Thus, it is possible to create distances between adjacent Wrdata pulses to within 4 ns. increments.

27 Claims, 17 Drawing Sheets

Fig. 11b

TABLE I

| TIMES | RD0 | RD1 | RD2 | RD3 | RD4 | RT6_24M | RT1_24M | RT11 | RT10 | RT9 | RT8 | RT7 | RT6 | RT5 | RT4 | RT3 | RT2 | RT1 |
|---|---|---|---|---|---|---|---|---|---|---|---|---|---|---|---|---|---|---|
| 0 ns.  | 0 | 0 | 0 | 0 | 0 | 0 (1st) | X | 1 | 0 | 0 | X | X | X | X | X | X | X | X |
| 2 ns.  | 1 | 0 | 0 | 0 | 0 | 0 | X | X | 1 | 0 | 0 | X | X | X | X | X | X | X |
| 4 ns.  | 0 | 1 | 0 | 0 | 0 | 0 | X | X | X | 1 | 0 | 0 | X | X | X | X | X | X |
| 6 ns.  | 1 | 1 | 1 | 0 | 0 | 0 | X | X | X | X | 1 | 0 | 0 | X | X | X | X | X |
| 8 ns.  | 0 | 0 | 1 | 0 | 0 | 0 | X | X | X | X | X | 1 | 0 | 0 | X | X | X | X |
| 10 ns. | 1 | 0 | 1 | 0 | 0 | X | 1 | X | X | X | X | X | 1 | 0 | 0 | X | X | X |
| 12 ns. | 0 | 1 | 1 | 1 | 0 | X | 1 | X | X | X | X | X | X | 1 | 0 | 0 | X | X |
| 14 ns. | 1 | 1 | 0 | 1 | 0 | X | 1 | X | X | X | X | X | X | X | 1 | 0 | 0 | X |
| 16 ns. | 0 | 0 | 0 | 1 | 0 | X | 1 | X | X | X | X | X | X | X | X | 1 | 0 | 0 |
| 18 ns. | 1 | 0 | 0 | 1 | 0 | X | 1 | 0 | X | X | X | X | X | X | X | X | 1 | 0 |
| 20 ns. | 0 | 1 | 0 | 1 | 0 | X | 1 | 0 | 0 | X | X | X | X | X | X | X | X | 1 |
| 22 ns. | 1 | 1 | 1 | 1 | 0 | 1 (2nd) | X | 1 | 0 | 0 | X | X | X | X | X | X | X | X |
| 24 ns. | 0 | 0 | 1 | 1 | 0 | 1 | X | X | 1 | 0 | 0 | X | X | X | X | X | X | X |
| 26 ns. | 1 | 0 | 1 | 1 | 0 | 1 | X | X | X | 1 | 0 | 0 | X | X | X | X | X | X |
| 28 ns. | 0 | 1 | 1 | 1 | 0 | 1 | X | X | X | X | 1 | 0 | 0 | X | X | X | X | X |
| 30 ns. | 1 | 1 | 0 | 0 | 0 | 1 | X | X | X | X | X | 1 | 0 | 0 | X | X | X | X |
| 32 ns. | 0 | 0 | 0 | 0 | 1 | X | 0 | X | X | X | X | X | 1 | 0 | 0 | X | X | X |
| 34 ns. | 1 | 0 | 0 | 0 | 1 | X | 0 | X | X | X | X | X | X | 1 | 0 | 0 | X | X |
| 36 ns. | 0 | 1 | 0 | 0 | 1 | X | 0 | X | X | X | X | X | X | X | 1 | 0 | 0 | X |
| 38 ns. | 1 | 1 | 0 | 0 | 1 | X | 0 | X | X | X | X | X | X | X | X | 1 | 0 | 0 |
| 40 ns. | 0 | 0 | 1 | 0 | 1 | X | 0 | X | X | X | X | X | X | X | X | X | 1 | 0 |
| 42 ns. | 1 | 0 | 1 | 0 | 1 | X | 0 | X | X | X | X | X | X | X | X | X | X | 1 |

5,047,967

DIGITAL FRONT END FOR TIME MEASUREMENT AND GENERATION OF ELECTRICAL SIGNALS

SUMMARY OF THE INVENTION

The invented circuit is an integrated circuit ("chip") which is a cell module for performing precise time measurements for use in applications such as disk drive controllers. The combination of the invented chip and a hard disk controller chip creates a complete hard disk controller in a single chip without the need for external analog components normally required for classic phase lock loop hard disk controllers. A problem in designing such a unified chip is that it must be digital in nature. Therefore, the maximum resolution with which signals generated by the disk drive (Rddata signals) can be measured and signals generated by the controller for writing to disk (Wrdata signals) can be generated is dependent on the clock which drives the controller chip. In hard disk controllers, the data rate is such that the minimum distance between adjacent Rddata or Wrdata pulses is approximately 100 ns which would require an oscillator having a speed which would be impractical in a design.

The invented chip, which in effect functions as a front-end to a disk drive controller chip, and specifically, a time measurement circuit, provides a solution to this problem. Using standard CMOS gates, the invented chip measures the distance between a reference clock and the Rddata pulse to 2 ns. accuracy. This measurement is provided as a binary number to the hard disk controller which uses this information along with the measurement for an adjacent pulse to determine the distance between adjacent pulses (cell time) to within 2 ns. For generating Wrdata pulses, the invented circuit accepts a binary number input which defines the distance to be delayed from the reference clock. This delay can be any multiple of 4 ns. over the period of the reference clock. Thus, it is possible to create distances between adjacent Wrdata pulses to within 4 ns. increments. In the preferred embodiment, the input clock to the invented chip is a 16 Mhz oscillator i.e., a CPU system clock, which is used to stabilize an internal oscillator which generates the required clocks to do the fine measurements that are required. One of the results of this internal oscillator is that a 24 Mhz clock is generated. This 24 Mhz clock is brought out of the controller front-end and used to drive the logic on the main hard disk controller chip.

BRIEF DESCRIPTION OF THE DRAWINGS

FIG. 11b is a table showing how to generate RD4-RDO which represents the location of the Rddata signal accurate to 2 ns.

DETAILIED DESCRIPTION OF THE INVENTION

An apparatus is disclosed for performing precise time measurements for use in applications such as disk drive controllers, the design of which eliminates the need for external analog components normally required for classic phase lock loop hard disk controllers. The invention will be described as a front-end to a hard disk controller, but it may also be utilized in other environments where it is desired to measure the distance (i.e., time delay) between an event and a reference clock.

Figure 1:
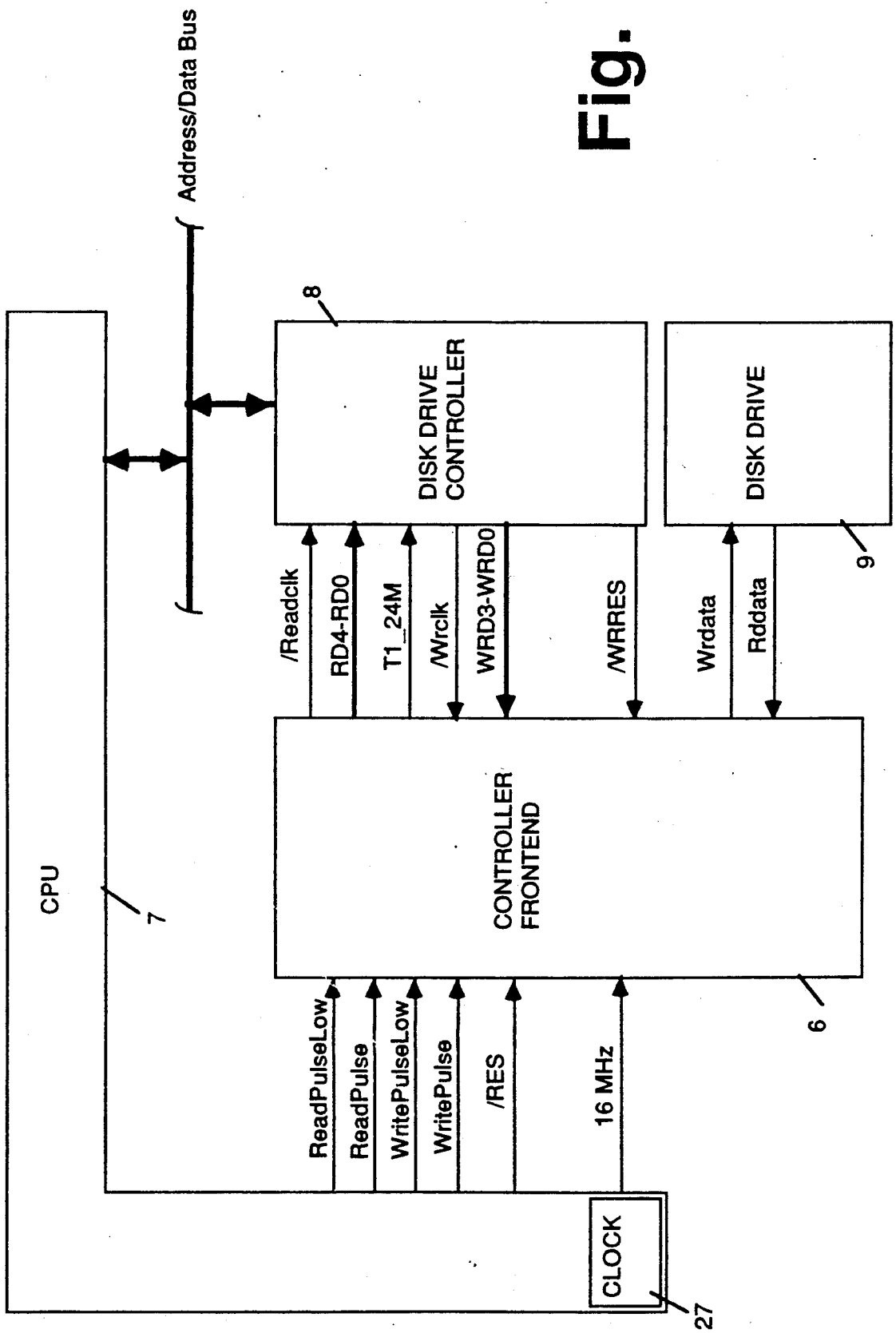
FIG. 1 is a block overview diagram showing the invented controller front-end in relation to a disk drive controller and a CPU.

Referring first to FIG. 1, the invented controller front-end 6 is shown with its inputs to and outputs from a CPU 7, disk drive controller 8 and disk drive 9. References to CPU 7 are defined as references to a computer system having a central processor, system clock, memory, registers, control logic, etc. of the type known in the art. Thus, the signals input to and output from CPU 7 shown in FIG. 1 are not necessarily generated directly by the central processor, but may be signals from a register or port, clock or other element comprising the computer system. However, the particular details regarding the generation of these signals is not needed for an understanding of the present invention and will only be described as is needed to obtain a proper understanding of the invention. These inputs and outputs are defined as follows:

16 MHz: This is a 16 MHz system clock.

Wrdata: This signal is the serial data output to disk drive 9. The location of this signal with respect to a 24 Mhz clock signal is defined using the four data bits WRD0-WRD3 (defined below) generated by controller 8.

Rddata: This signal is the serial data input from disk drive 9. The valid edge of this signal is detected to within 2 ns accuracy and this information is provided as a binary number RD4-RD0 (defined below) to disk drive controller 8. The distance between adjacent valid edges of this signal must be at least two 24 Mhz clock periods.

ReadPulseLow: This signal from the CPU is used to define whether the Rddata signal is a high or low going pulse. If this signal is high then Rddata is a low pulse, if this signal is low then Rddata is a high pulse.

ReadPulse: This signal from the CPU is used to define whether the Rddata signal is a pulse or a toggle signal. If this signal is high then Rddata is a pulse signal, otherwise Rddata is a toggle signal. As used herein, toggle means every transition of this signal is a valid time point rather than just the rising or falling edge of the pulse.

WritePulseLow: This signal from the CPU is used to define whether the Wrdata signal should be a high or low going pulse. If this signal is high then Wrdata should be a low pulse, if this signal is low then Wrdata should be a high pulse.

WritePulse: This signal from the CPU is used to define whether the Wrdata signal is a pulse or a toggle signal. If this signal is high then Wrdata is a pulse signal, otherwise Wrdata is a toggle signal.

/Wrclk: This signal from controller 8 is one 24 Mhz clock wide and is used to tell controller front-end 6 when the data WRD0-WRD3 is valid. /Wrclk pulses may not occur on adjacent 24 Mhz clock periods, otherwise false Wrdata pulses will be generated.

WRD3-WRD0: These signals from controller 8 are data bits which provide data to be used by controller front-end 6 for determining where the Wrdata pulse should be placed with respect to the 24 Mhz clock.

/WRRES: This signal from controller 8 is used to initialize a toggle flip-flop used for generating the Wrdata signal.

/RES: This signal is a hardware generated main reset signal of the computer system which is used for getting all the flip-flops in the frontend (and elsewhere) into known states.

/Readclk: This signal to controller 8 goes low for one 24 Mhz clock cycle when the data on RD0-RD4 is valid. The combination of this signal and RD4-RD0 is used by the disk drive controller 8 for creating a precise measurement of the distance between adjacent Rddata pulses.

RD0-RD4: These signals are the data information which represent the location of the Rddata transition relative to the 24 Mhz clock.

T1_24M: This signal is the 24 Mhz reference clock be used by the disk drive controller 8.

Figure 2:
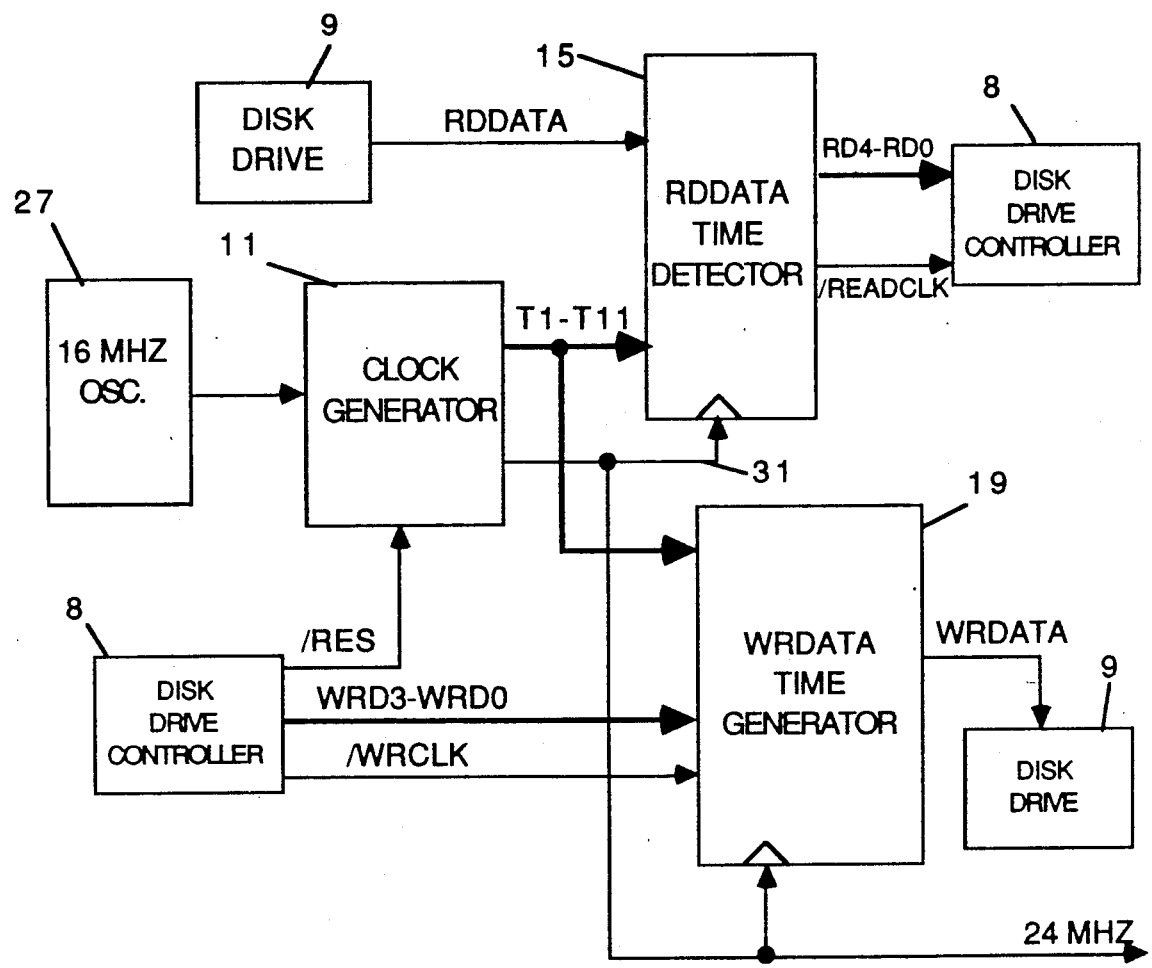
FIG. 2 is a block overview diagram showing the main elements of the invented controller front-end.

Referring now to FIG. 2, controller front-end 6 comprises three major portions, a clock generator 11 which is used to create the clocks required for the high resolution measurements needed; a Rddata time detector 15 which uses the clocks to measure the location of the Rddata signal and generate a binary number RD4-RD0 representing the location; and a Wrdata time generator 19 which uses these clocks to convert the binary input number WRD3-WRD0 into a Wrdata signal.

CLOCK GENERATOR 11

Figure 3:
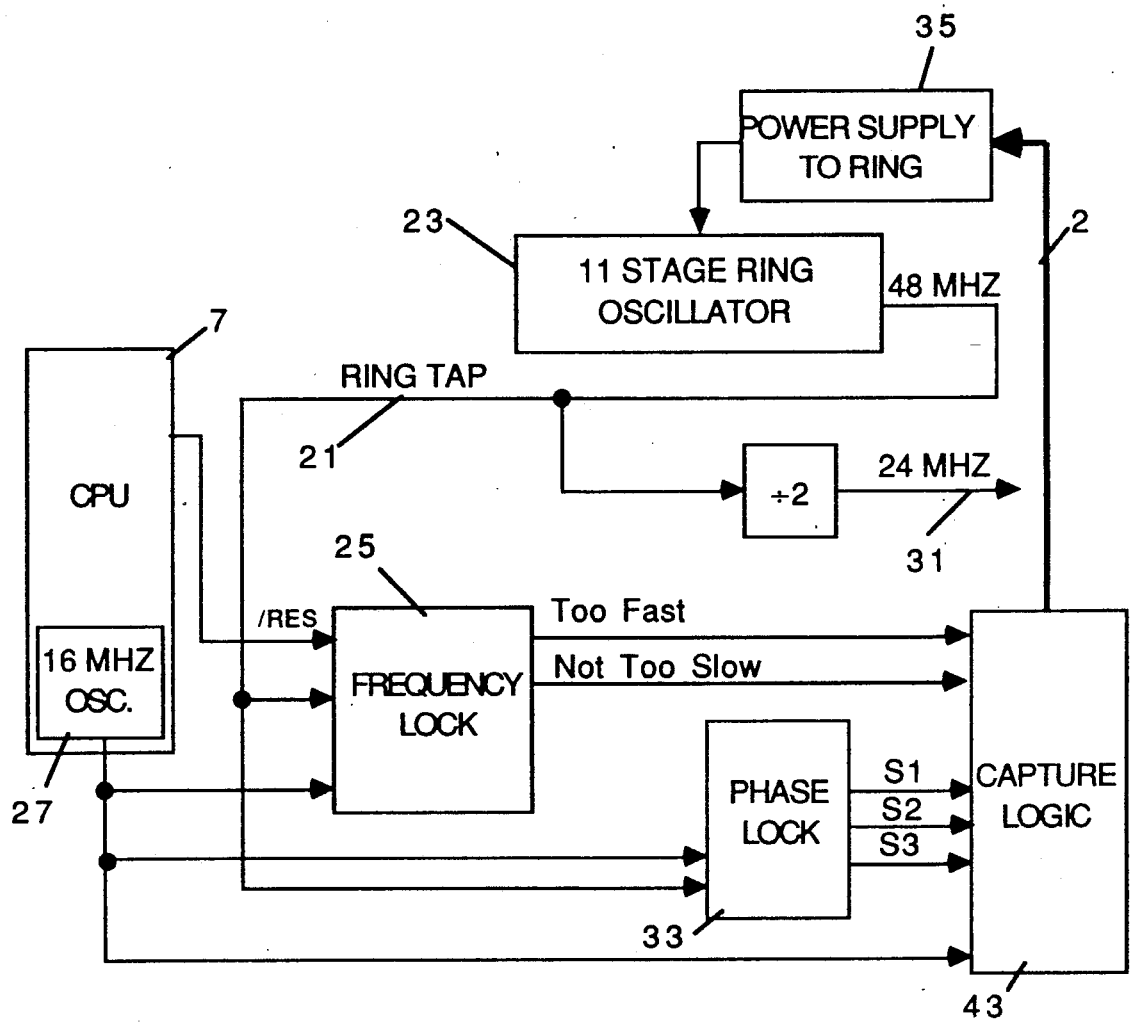
FIG. 3 is a block diagram of clock generator 11.

Referring now to FIG. 3, the clock generator comprises an eleven stage ring oscillator 23 in which a tap 21 from one of the eleven stages from the oscillator is divided by three and phase compared to an external 16 Mhz oscillator 27. The resulting phase difference is then used to modulate the power supply on the ring oscillator until the external 16 Mhz clock 27 and the internal clock generated by ring oscillator 23 and divided by 3 are phase locked. In this manner, the tap from the ring runs at a frequency of 16 * 3=48 Mhz. Thus it is possible to obtain a 24 Mhz signal 31 by dividing the 48 Mhz signal generated by ring oscillator 23 by two.

The phase locking is done using a frequency lock circuit 25 which brings the frequency close to the desired final frequency and a phase lock circuit 33 which is used to lock in on the exact frequency. While the frequency lock circuit is operating, it has full control of the power supply voltage variation supplied to ring oscillator by ring power supply 35. Once the frequency is close enough for phase lock circuit 33 to take over, the frequency lock circuit becomes essentially idle. The frequency lock circuit is necessary because process variations may cause the ring to start oscillating at frequencies which are less than half of 48 Mhz or greater than twice 48 Mhz. Thus, without frequency lock circuit 25, it would be possible for the phase lock circuit to lock on multiples of 48 Mhz producing an erroneous frequency. The function of frequency lock circuit 25 is to detect when the ring oscillator is too slow or too fast, then increase (if too slow) or decrease (if too fast) the ring oscillator power supply until the frequency of the ring is close to 48 Mhz. Of course, if the frequency of clock 27 is increased or decreased then the time resolution will be proportionately smaller or larger, respectively.

Figure 4:
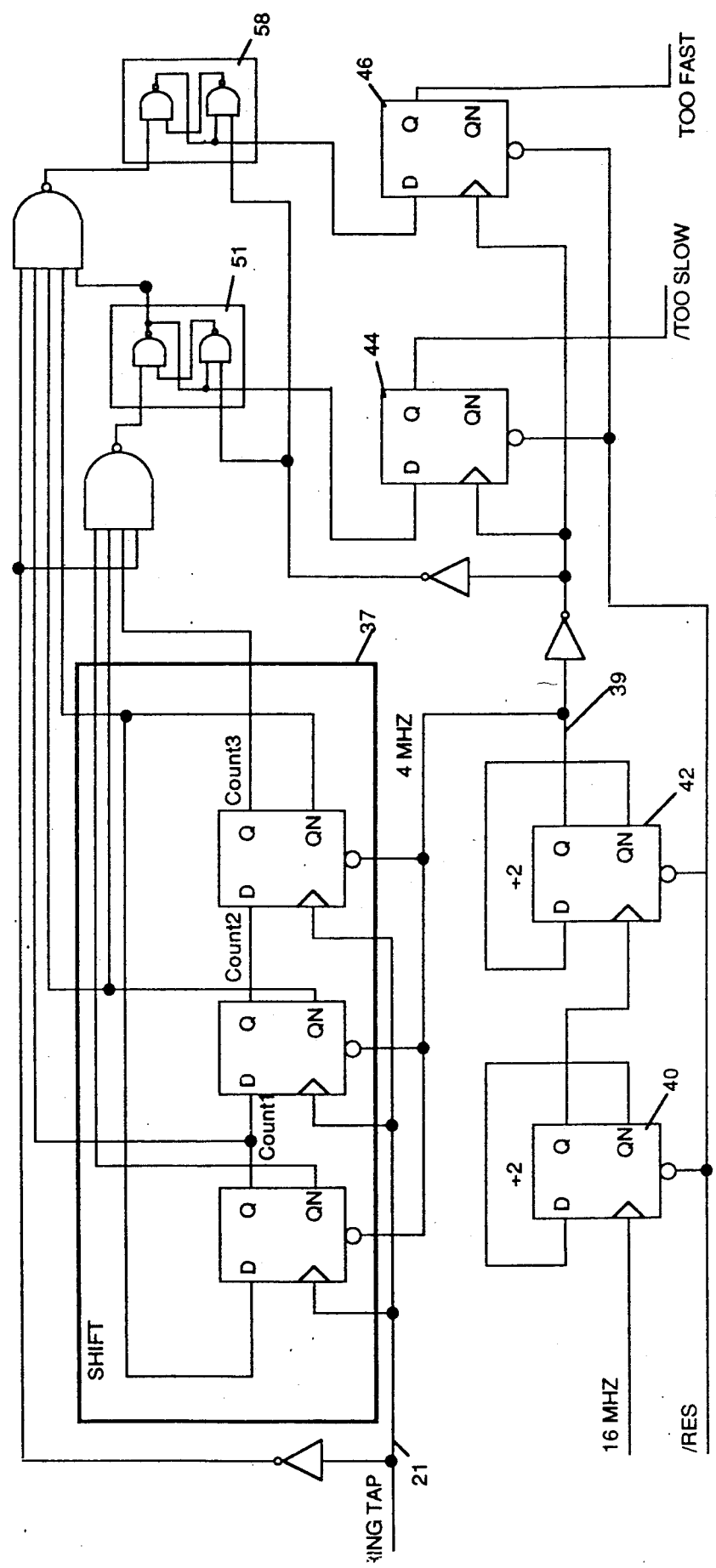
FIG. 4 illustrates shift counter 37 and latch of frequency lock circuit 25.

Referring now to FIG. 4, frequency lock circuit 25 uses a shift counter 37 to count the number of rising edges of the ring tap 21 that occur within half of a 4 Mhz period. This information is then used to determine if the 48 Mhz oscillator is running too fast, too slow or at approximately the correct frequency.

Shift counter 37 accumulates the count while a 4 Mhz signal 39 generated by divide by 2 flip-flops 40 and 42 is high. On the falling edge of the 4 Mhz signal, the count status is captured and held until the next falling edge of the 4 Mhz signal. The count pattern for shift counter 37 as a function of ring tap 21 is as follows:

| Ring Tap | Counter | Count | Ring Tap | Counter | Count |
|---|---|---|---|---|---|
| 1 | 000 | 1 | 1 | 111 | 4 |
| 0 | 000 | 1 | 0 | 111 | 4 |
| 1 | 100 | 2 | 1 | 011 | 5 |
| 0 | 100 | 2 | 0 | 011 | 5 |
| 1 | 110 | 3 | 1 | 001 | 6 |
| 0 | 110 | 3 | 0 | 001 | 6 |

Figure 5A:
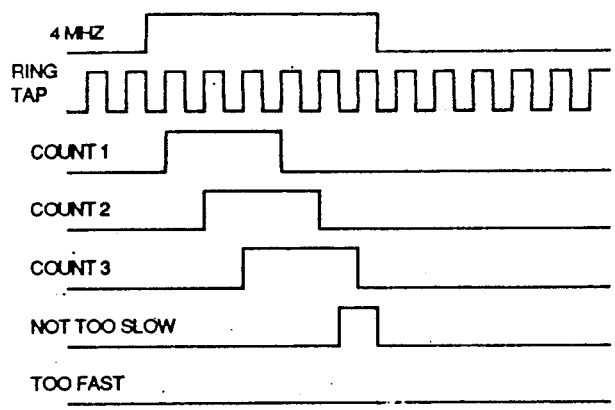
FIGS. 5a-5c illustrate the relationships between various signals input to and output from frequency lock 25.
Figure 5B:
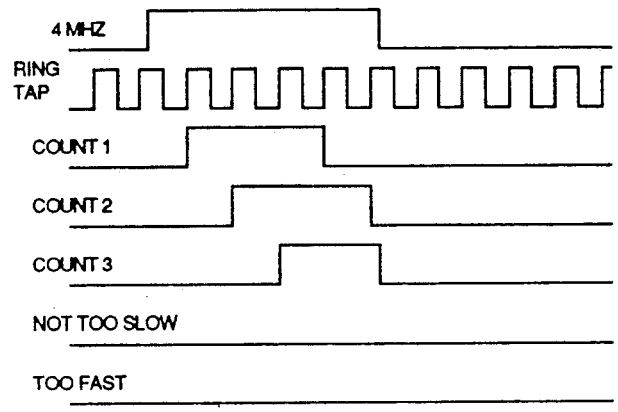
Figure 5C:
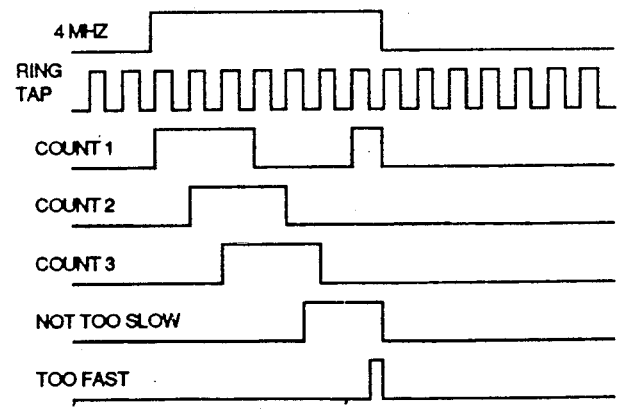

Ideally, there should be six ring tap rising edges during the time in which the 4 Mhz clock is high as shown in FIG. 5a where Count 1 is high for three cycles of ring tap 21, Count 2 is high for three cycles of ring tap 21 after a delay of one cycle and Count 3 is high for three cycles of ring tap 21 after a two cycle delay. Therefore, any count less than six (0 0 1) would imply that the oscillator is too slow (FIG. 5b), and any count greater than six would imply that the oscillator is too fast (FIG. 5c). However, this method of determining whether the oscillator is too fast or too slow is not quite adequate because it is possible for the ring to be running just a little too slow causing counter 37 to only count to five. Should this occur, the frequency lock circuit would compensate by forcing the ring to operate faster as described below with reference to capture logic 43.

However, since capture logic 43 in this case causes a correction to be applied over an entire 4 Mhz period, it is possible for the frequency to be substantially increased. This could cause problems since if the proper frequency is already locked on, then noise causes a small decrease in the ring frequency causing the frequency lock circuit to operate as through the ring is too slow. The frequency will then be sped up over an entire 4 Mhz period causing the frequency to increase by a much greater amount than there was in error. This could create significant problems if the ring frequency is being used at this time by other portions of the controller front-end 6.

In order to compensate for this problem, it is necessary to widen the range in which the frequency lock detects that the ring is operating at the correct frequency. This is done as follows: When counter 37 reaches a count of 0 0 1 and the ring clock (i.e., ring tap 21) is low, a latch 51 will be set that indicates that the ring is not running too slow. Furthermore, if this latch is set and the counter counts around to 1 0 0 with the ring clock low, another latch 58 will be set which indicates that ring 23 is running too fast. This ensures that frequency lock circuit 25 will only capture a too slow or too fast state if the period of the ring 23 is at least ±20 ns in error.

The not too slow and too fast signals are captured by flip-flops 44 and 46 on the falling edge of the 4 Mhz clock. If not too slow is captured high while too fast is captured low then, as far as the frequency lock circuit 25 is concerned, the frequency is correct and the phase lock circuit 33 will take over the locking process. If the not too slow signal is captured low, then the frequency is too slow and the power supply to ring 23 will be increased by operation of capture logic 43 as will be discussed below until the not too slow signal is captured high. Finally, if the too fast signal is captured high then the frequency is too fast and the power supply to ring 23 will be decreased by operation of capture logic 43 until the too fast signal is not captured high. Frequency lock circuit is not needed if the ring can be implemented such that process variations are strictly controlled and the ring is operated within a limited voltage and temperature range.

Figure 6A:
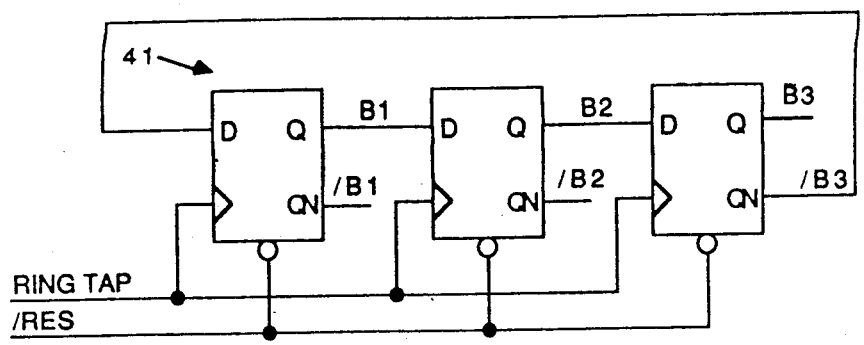
FIGS. 6a-6b show the main elements of phase lock 33.
Figure 6B:
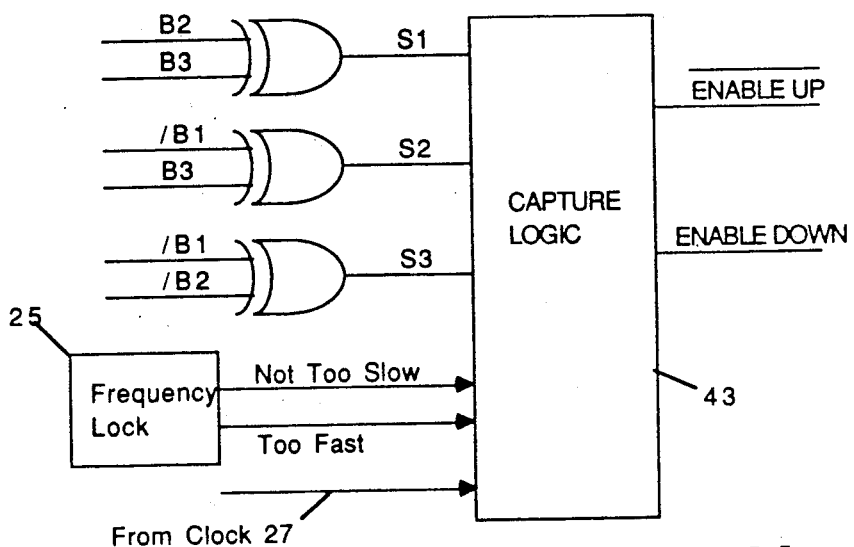
Figure 6C:
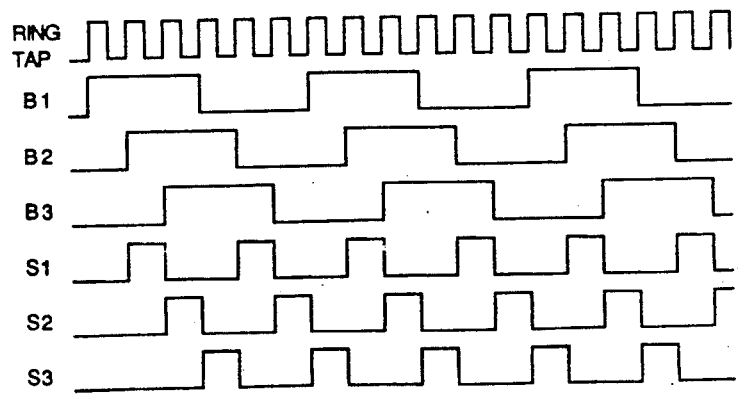
FIG. 6c shows the relationship between the ring tap signal and various signals generated by phase lock 33.

Phase lock circuit 33 generates three clock signals S1, S2 and S3 which are each a divide by three of the ring oscillator. These signal are all evenly out of phase with each other. As shown in FIG. 6a, the signals are generated using a three stage shift register 41 which divides the ring clock by six, and generates the signals B1, /B1, B2, /B2, B3 and /B3 then exclusive-ORing B2-B3, /B1-B3 AND /B1-/B2 to generate the desired clocks S1, S2 and S3 as shown in FIG. 6b. If the ring is running at 48 Mhz, then each one of these clocks would be running at 16 Mhz.

Figure 6D:
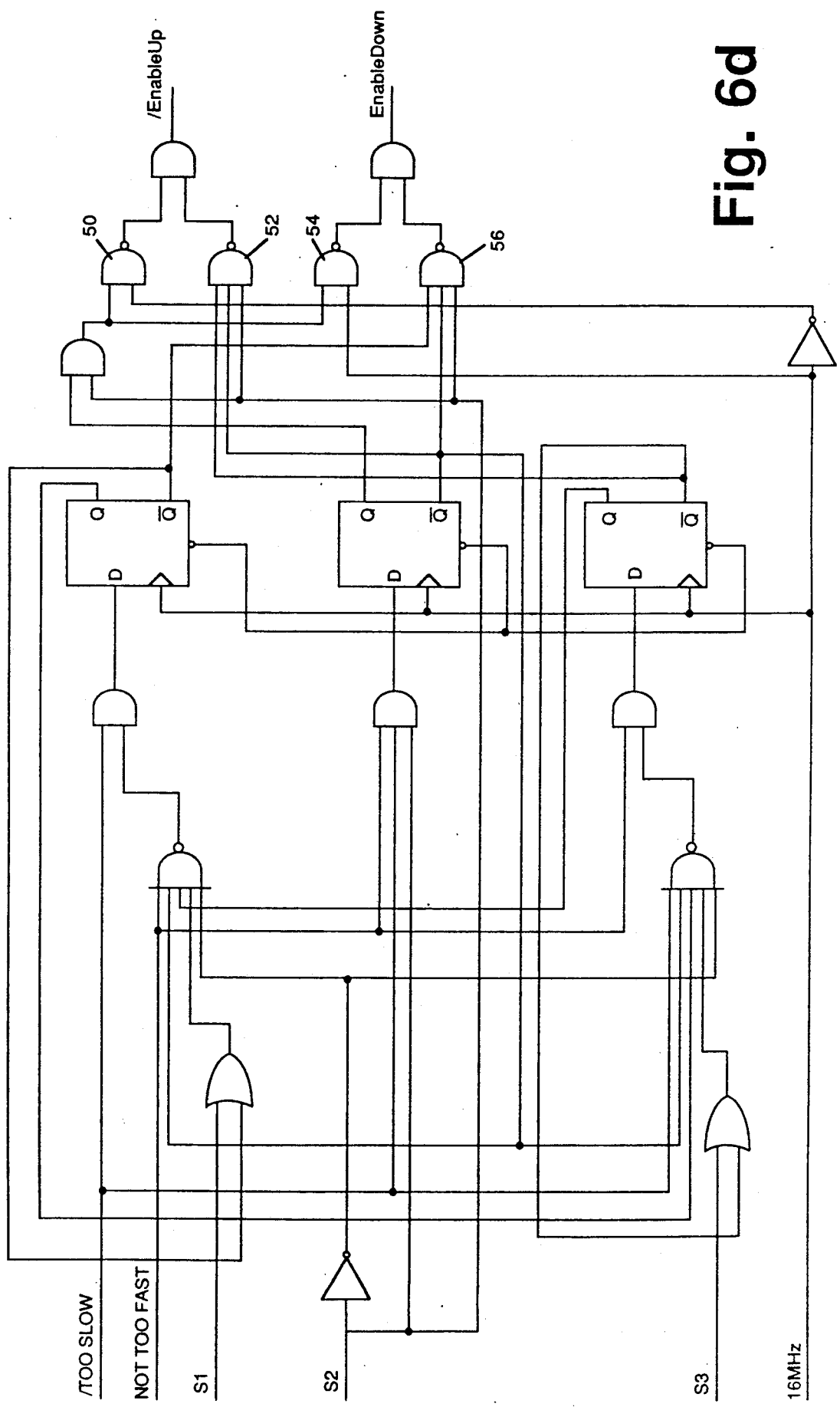
FIG. 6d is a block diagram of capture logic 43.

The states of clocks S1, S2 and S3, along with the not too slow and too fast signals generated by frequency lock logic 25, are captured by the external 16 Mhz clock using capture logic 43 as shown in FIG. 6d and are used to determine whether to increase (EnableDown) or decrease (/EnableUp) the power supply to ring 23. If the frequency lock signals indicate that the ring is either too fast or too slow, then these signals will dominate and force the power supply accordingly. Otherwise the frequency lock signals have no effect and the only pertinent information is the state of S1, S2 and S3. In this connection, in the following discussion of the operation of capture logic 43, S2 has arbitrarily been selected as the reference signal. What this means is that S2 is the signal with which the external 16 Mhz clock 27 will be phased compared for achieving zero frequency difference. S1 and S3 are used for determining if the frequency is slipping through the S2 region. These act as a fine tuning device for the frequency locking. This is done by NAND gates 50, 52 54 and 56 which detect whether the rising edge of the external 16 Mhz clock occurred in the S2 region. If the next two rising edges of the clock occurred in the S1 region then this would indicate that the frequency is too slow and the power supply should be increased by EnableDown. Conversely, if the next two rising edges were to occur in the S3 region, then the ring frequency is to fast and the power supply would be decreased by /EnableUp. The details of capture logic 43 are shown in FIG. 6d.

Figure 7:
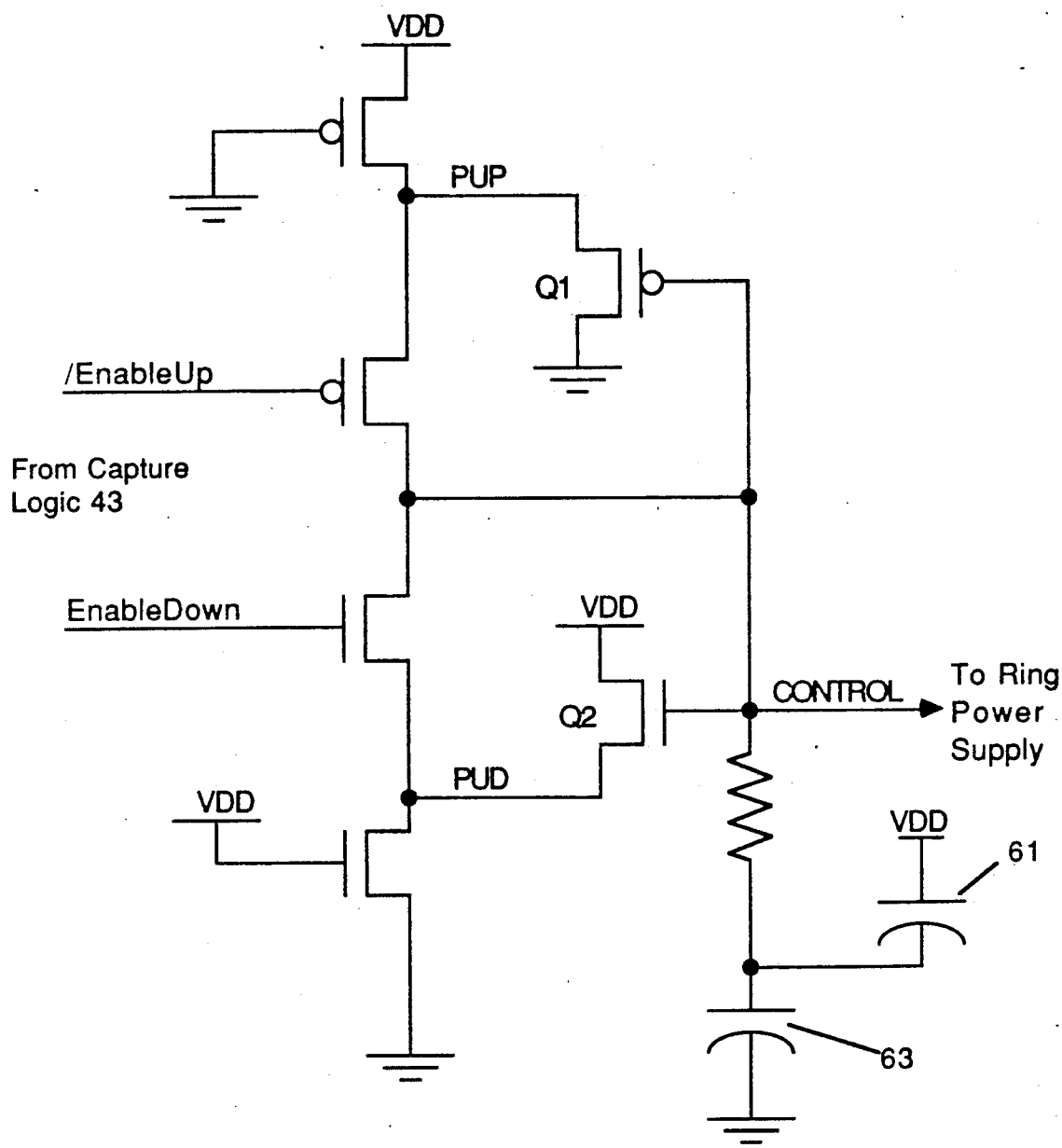
FIG. 7 is a schematic diagram showing the circuit which generates the CONTROL signal for the network used to drive ring oscillator 23.

Controlling the power supply voltage is done by either pulling up or pulling down a node by selecting either a pull-up or pull-down device on the node as shown in FIG. 7. A P type transistor labeled Q1 and an N type transistor labeled Q2 are clamp transistors used to reduce transients from the capacitance on the PUP and PUD nodes. The capacitor 61 tied to VDD is twice the size of the capacitor 63 tied to VSS to reduce the VDD noise sensitivity. A CONTROL signal is used to drive a network i.e., power supply 35 (see FIG. 8) which produces the power supply to the ring. This network will be described below, but for now it is important to note that as the CONTROL voltage increases, the power supply 35 voltage decreases, and as the CONTROL voltage decreases the power supply 35 voltage increases. Using this network it is now possible to see how power supply 35 can be controlled. If frequency lock circuit 25 determines that the frequency is too slow, then the EnableDown signal will be forced on resulting in the power supply voltage increasing. Conversely, if frequency lock circuit 25 determines that the frequency is too fast, then the /EnableUp signal will be forced on resulting in the power supply voltage decreasing. If the frequency lock circuit is satisfied with the frequency, but the rising edge of the 16 Mhz clock detects that there has been a slip into either the S1 or S3 region, then the /EnableUp and EnableDown signals can again be forced to compensate. If the rising edge of the 16 Mhz clock lands in the S2 region and there is no frequency error as far as frequency lock circuit 25 is concerned, then the /EnableUp signal will turn on while the 16 Mhz clock is low and the EnableDown signal will turn on while the 16 Mhz clock is high. When the net charge transferred into capacitors 62 and 63 equals zero, the loop will be locked.

Figure 8:
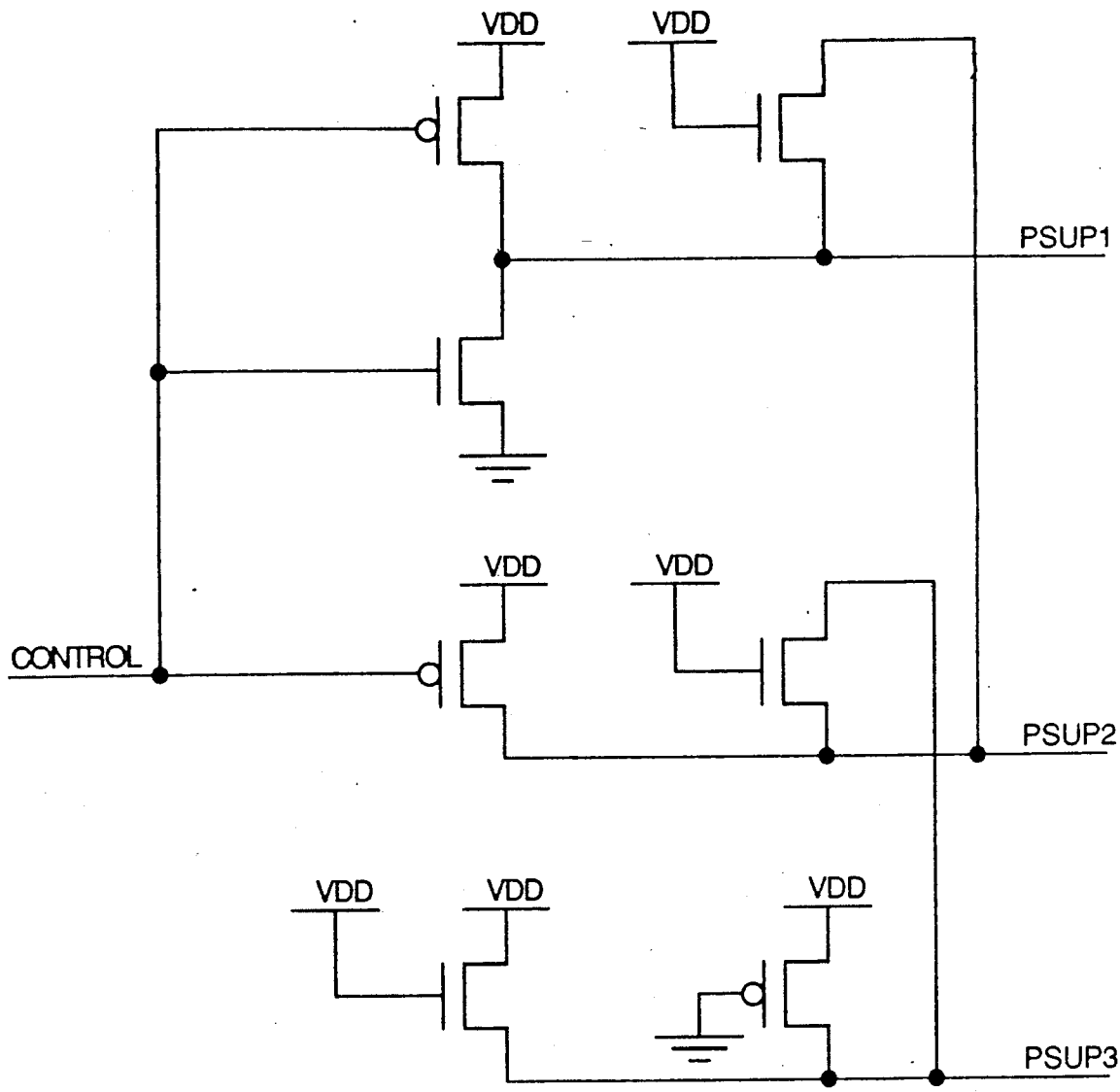
FIG. 8 is a schematic diagram showing the network used to drive ring oscillator 23.
Figure 9:
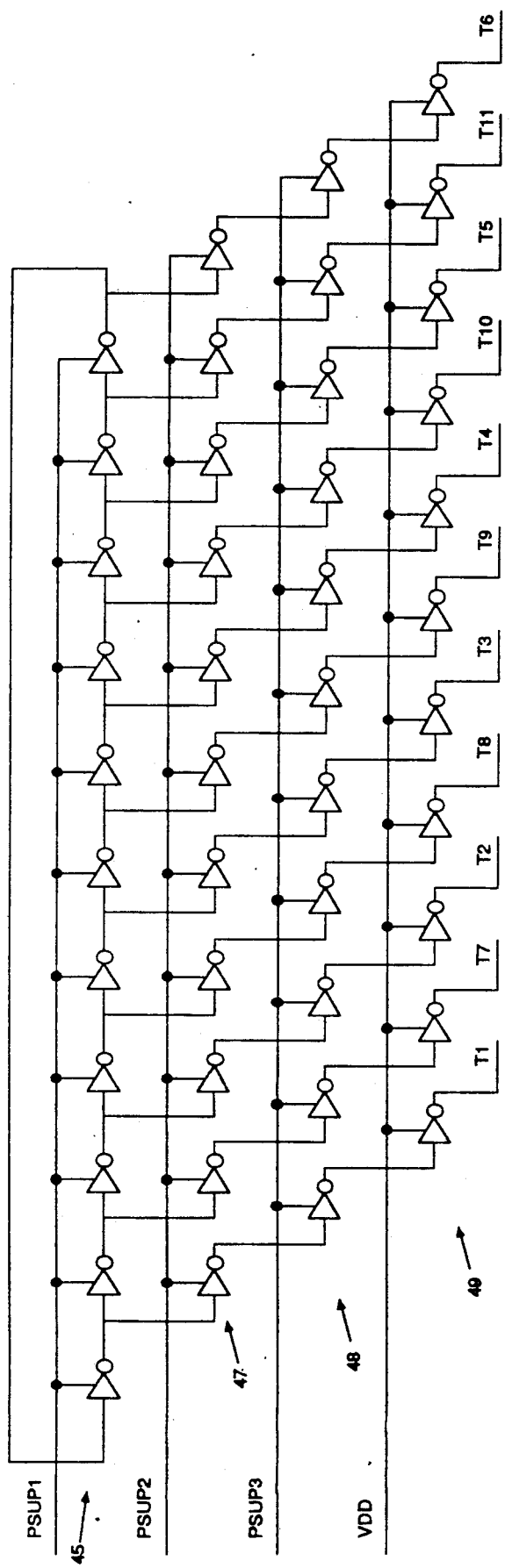
FIG. 9 is a schematic diagram showing ring oscillator 23.

Ring 23 itself comprises eleven inverters 45 strung together (see FIG. 9). Each inverter drives the next inverter in the ring plus a buffer inverter in a first stage 47 of buffer inverters. There are three stages of buffer inverters 47-49 required. The first two stages 47 and 48 have power supply voltages PSUP2 and PSUP3 which are scaled from the voltage PSUP1 which the ring is running at. The last stage 49 is running on the main power supply voltage VDD of the chip. The reason for having the intermediate stages is that under fast-fast process, high voltage and low temperature, the ring runs at a voltage of 1.8 volts. Thus, the maximum swing of any ring signal would be 0 to 1.8 volts. This voltage value is not high enough to drive the thresholds of any devices which are operating on the main power supply. Therefore, it is necessary to step up the voltage by moving through buffers which run at incrementally higher voltages until finally reaching the main power supply voltage. The CONTROL signal which was discussed above is used to generate the three power supply voltages PSUP1-PSUP3 as shown in FIG. 8 which may be implemented by seven transistors. In the network of FIG. 8, the voltages verses CONTROL signal variation is kept fairly linear, and with a slope that will not cause the ring frequency to vary significantly with any ripple which may exist on the CONTROL signal.

FIG. 9 shows the structure of ring 23 comprising inverter stage 45 and buffer stages 47-49. Inverter stage 45, the first two ring buffer stages 47-48, the power supply driving network (FIG. 8), and the capacitors shown in FIG. 7 all use a VDD and VSS which are separate from the VDD and VSS which drive the rest of the controller front-end. This is done to minimize the power supply noise which can be introduced by the digital components in the chip.

RDDATA TIME DETECTOR 15

Figure 10:
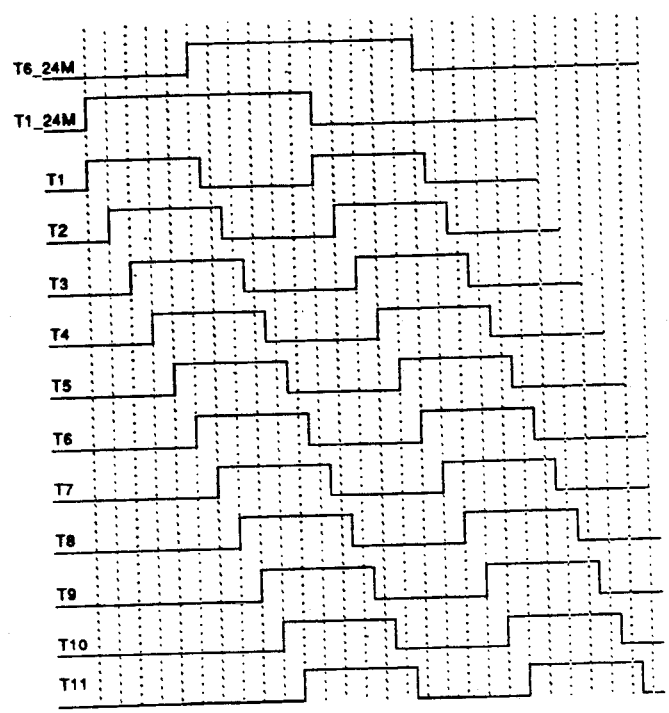
FIG. 10 shows the relative timings between taps T1-T11 of ring oscillator 23 and resulting 24 Mhz signals generated for two of the taps.

The resulting ring produces eleven 48 Mhz oscillators numbered in order T1 to T11 from buffer stage 49, each phased from each other by 2 ns. as shown in FIG. 10. One of these taps is chosen as the reference tap for generating the 24 Mhz signal to be used by disk drive controller 8 as well as Rddata time detector 15 and Wrdata time generator 19. The one which has been arbitrarily chosen is T1 and the resulting 24 Mhz signal is referred to herein as T1—24M. With this information, it is now possible to accurately measure the location in which a Rddata transition occurs with respect to the T1—24M clock. This is done by taking a "snap shot" of the ring oscillator when the Rddata signal transitions from high to low (assuming ReadPulseLow is high). Of course this information will only define the location of the transition within a half period of the T1—24M clock since the ring is running at 48 Mhz. Therefore, it is also necessary to capture the state of the T1—24M clock when the transition occurs. The state of the T1—24M may not be reliable depending on when the capture is taken. To resolve this, another 24 Mhz clock is generated using the T6 tap which produces a signal called T6—24M which is approximately 90° out of phase with the T1—24M clock.

Figure 11A:
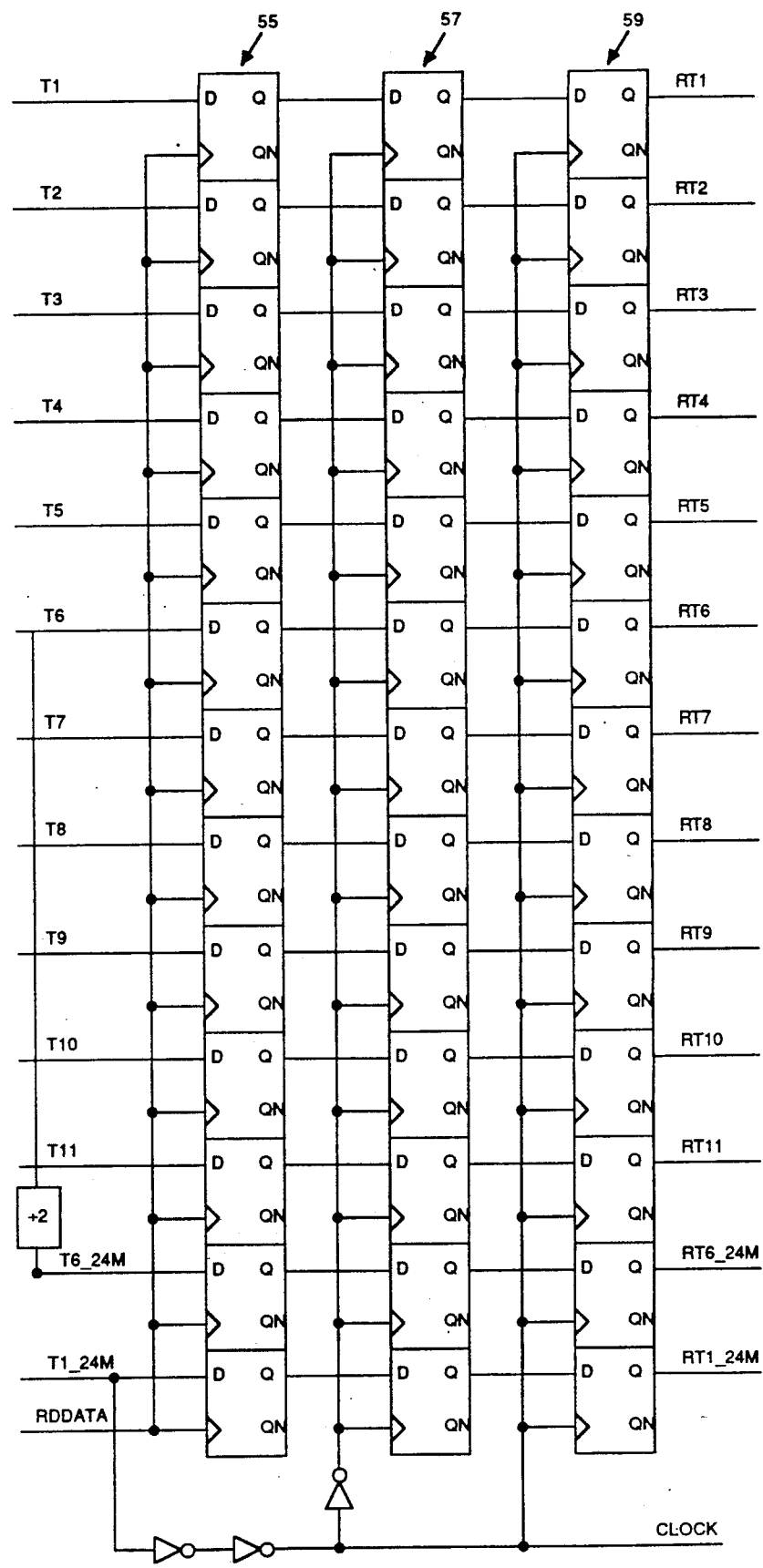
FIG. 11a is a schematic diagram of three layers of flip-flops used to determine the distance between T1_24M and the Rddata signal.

FIG. 11a shows that each ring tap is captured on the rising edge of Rddata as well as the states of the T1—24M and T6—24M signals by flip-flop layer 55. The next two layers of flip-flops 57 and 59 are used to resolve the metastable conditions that may arise. The second rank of flip-flops 57 are clocked on the falling instead of rising edge of the T1—24M clock in order to reduce the amount of time between the rising edge of Rddata and the time in which signals from flip-flop layer 55 will be valid. The third rank of flip-flops 59 are clocked on the rising edge of the T1—24M clock. At this point it is possible to use the captured information represented by the signals RT1—RT11, RT1—24M and RT6—24M to produce a five bit binary number which represents the the distance between the rising edge of the T1—24M signal and the Rddata signal. This is done by merely encoding the information using Table I shown in FIG. 11b where the five bit binary number is represented by RD4-RD0.

The left portion of Table I shows all the possible combinations of 48 Mhz clock captures that can take place over both halves of the T1—24M period. It can be seen that RT1=1, RT2=0 and RT3=0 is considered the reference phase since the rising edge of T1 is what creates the T1—24M signal. Due to propagation delays, the actual location of the T1—24M signal relative to the rising edge of the T1 signal is not precisely defined. Therefore, it is possible if the Rddata transition occurs around the transition, either high or low of the T1—24M signal, for there to be an uncertainty in whether the Rddata occurred in the first or second half of the T1—24M period. This is where the T6—24M signal comes into play. Between the time in which T1 transitions from low to high and T6 transitions from low to high, the T6—24M signal is used to determine whether the Rddata transition occurred in the first or second half of the clock period. This eliminates the uncertainty that occurs around the rising edge of the T1 signal. The resulting information RD4-RD0 is a binary number which represents the location of the Rddata signal relative to the reference T1—24M signal accurate to 2 ns.

Of course, no data is valid without a clock to reference when the data is valid. In this case it, is very important that the clock be properly located because disk drive controller 8, which is coupled to controller front-end 6 calculates the distance between adjacent Rddata pulses by counting the number of 24 Mhz clocks that occur between these clocks plus the excess amount that is provided by the binary number represented by RD4-RD0. Thus, if the clock is misplaced it can result in a full 24 Mhz clock error in measuring the cell, which is not tolerable when trying to make measurements to within 2 ns accuracy. The data reference clock Readclk is generated using the circuit shown in FIG. 12.

Figure 12:
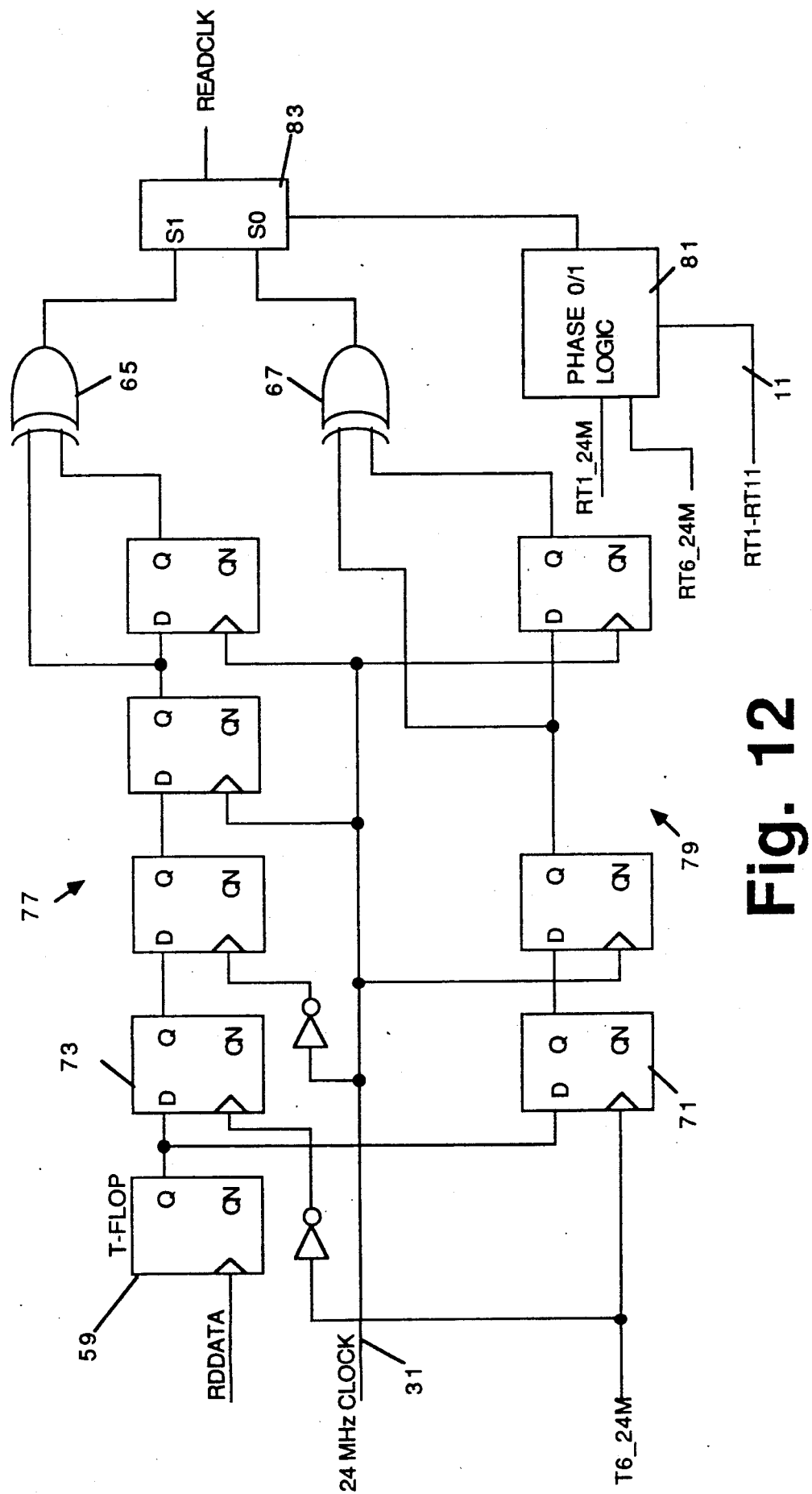
FIG. 12 is a schematic of a circuit used to generate the signal Readclk.

Every time that a Rddata rising edge occurs, the output to T-flip-flop is changed. This output is sampled by both the rising and falling edge of the T6—24M signal by flip-flops 71 and 73 respectively. The resulting signal is then shifted through several stages 77 and 79 in order to synchronize with the reference clock signal 31 (T1—24M). These signals then are converted into one clock wide pulses using exclusive OR gates 65 and 67 as shown in FIG. 12. The reason for having the two paths is that if the Rddata transition occurs near the rising edge the T6—24M signal, then an uncertainty region is created between where the Rddata rises and the T6—24M rises. This uncertainty can cause the position of the Readclk to be shifted by one entire clock depending on which portion of the uncertainty region the Rddata rises in. Thus, by also capturing the information on the falling edge of the T6—24M signal, it can be guaranteed that one of the two answers will be correct.

The decision as to which Readclk is the correct one is determined by figuring out whether the Rddata transition occurred in the first (phase 0) or second (phase 1) half of the T1—24M clock period. This is done in the same manner that was used in determining the phase position for the RD4-RD0 signals by phase 0/1 logic 81. Thus, referring to FIG. 10, it can be seen that if the Rddata rise occurred in the first half of the clock period, then the rising edge of T6—24M cannot be used because this occurs during this phase of the clock, therefore, the falling edge of T6—24M should be used. The same is true for the falling edge of T6—24M when the Rddata rises in the second half of the clock period. Phase 0/1 logic 81 generates a signal which selects S1 of multiplexor 83 when the falling edge of T6—24M should be used and S0 when the rising edge should be used based upon the inputs RT1—24M, RT6—24M and RT1-RT11. FIG. 11b shows the inputs to logic 81 and the corresponding clock period (1st half or 2nd half). A final point to be noted on the Rddata time detector is that the minimum distance between adjacent Rddata pulses must be at least two 24 Mhz clocks or 84 ns. in order to allow the metastables to settle (see FIG. 11a).

WRDATA TIME GENERATOR 19

Figure 13:
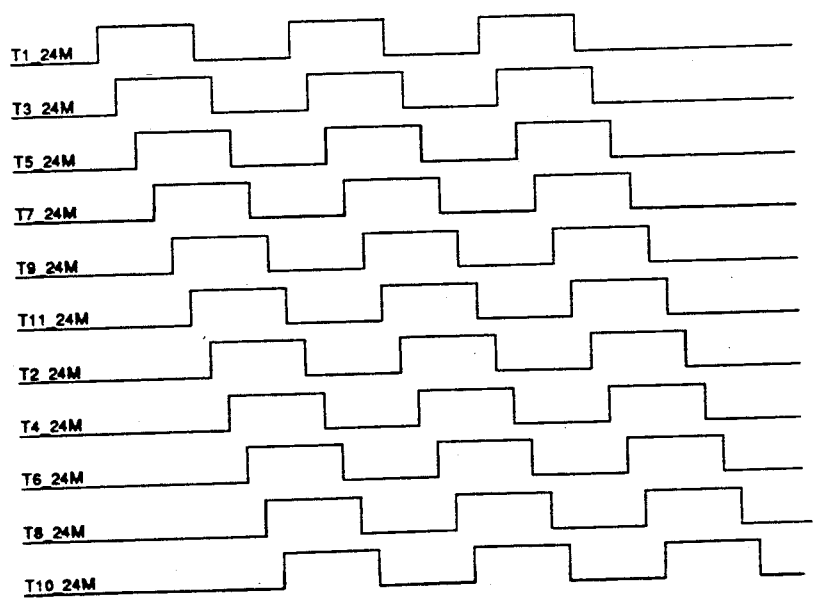
FIG. 13 shows the relative timings between the 24 Mhz signals generated for taps T1-T11.

The Wrdata signal is generated by converting a 4 bit binary number WRD3-WRD0, which is valid while /WRCLK is low and T1_24M is rising, into a signal whose location with respect to T1_24M varies depending on the binary number. WRD3-WRD0 are generated by disk drive controller 8 and represent the number of 4 ns. increments relative to the T1_24M clock to delay before a Wrdata pulse is generated for input to disk drive 9 by controller front-end 6. /Wrclk is generated by disk drive controller 8 when WRD3-WRD0 are valid. The location can be varied in 4 ns. increments. Thus, since there are eleven ring taps, there are eleven different possible locations for the Wrdata pulse to occur. The 4 ns. increment is generated by dividing all the ring oscillator taps by two which will produce eleven 24 Mhz signals each phased by 4 ns. In order to not lose the phase relationship between the 24 Mhz signals, the division is done by dividing the T1 signal by two, then shifting this signal through a string of eleven flip-flops, the first of which clocks on T11 the next on T10 and so on until reaching T1. The resulting clocks T1_24M-T11_24M are shown in FIG. 13.

Figure 14:
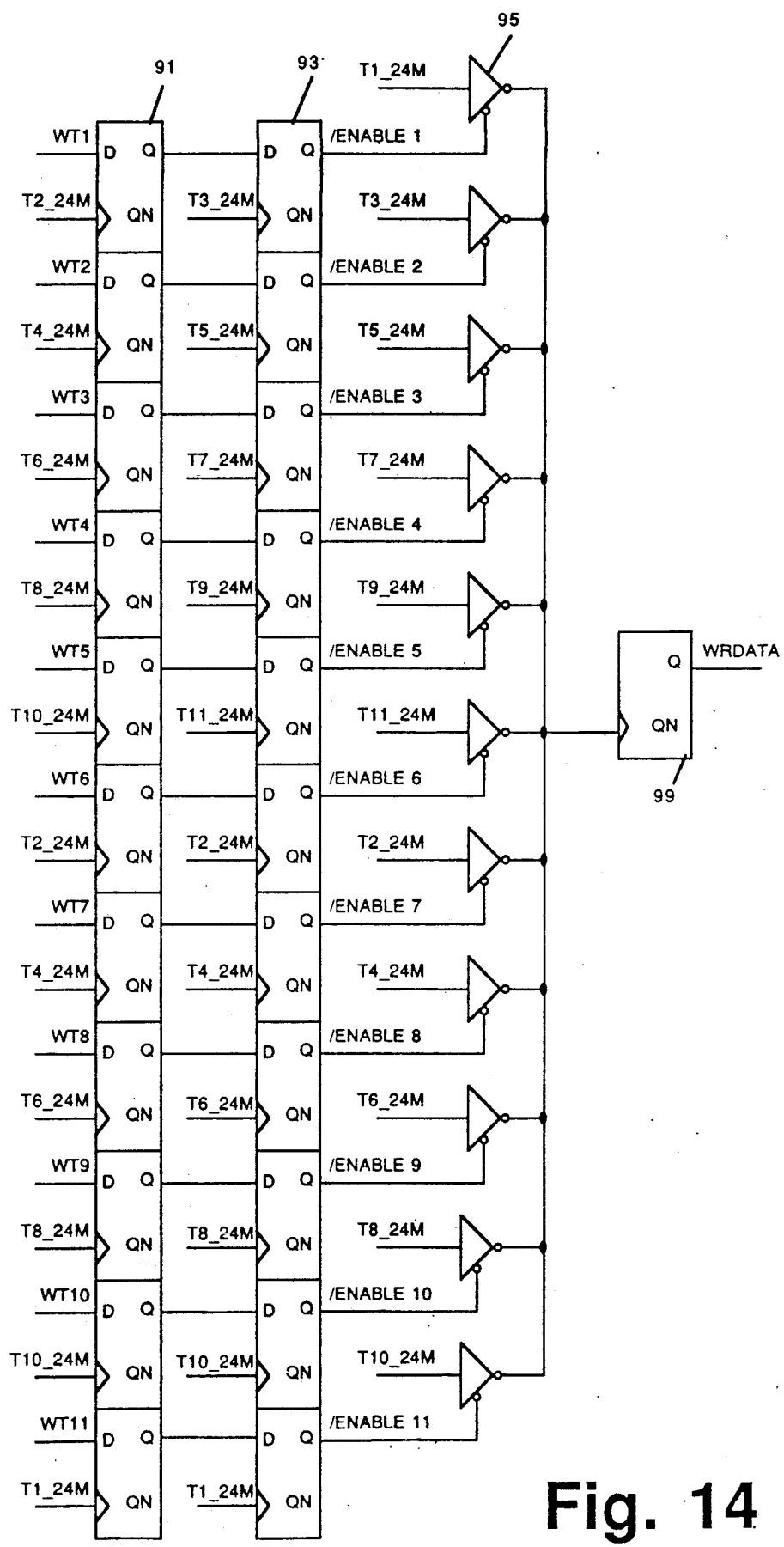
FIG. 14 is a schematic diagram of a circuit used to generate the Wrdata signal.

Using clocks T1_24M-T11_24M, it is now possible create the Wrdata pulse by selecting one of the T1_24M-T11_24M clocks to generate the signal as shown in FIG. 14. This selection is made based on a binary number represented by the four data bits WRD3-WRD0 while the /Wrclk signal is low. When the /Wrclk signal is low, the four data bits which represent WRD3-WRD0 will be captured by four flip-flops. The information is then held for two clock cycles after which the four flip-flops are all set high. During the two clocks in which the data is valid, the information is decoded to create eleven select signals WT1-WT11, each one intended to select one of the eleven 24 Mhz clocks to create the Wrdata signal. The decoding is done using Table 2.

The signals WT1-WT11 are the selects for the desired clock to generate the Wrdata signal. WT1 is used to select the T1_24M clock to generate the Wrdata signal, WT2 is used to select the T3_24M clock and so on to WT11 which is used to select the T10_24M clock. The actual selecting of the various clocks to generate the Wrdata signal is done using the circuit shown in FIG. 14.

Figure 15:
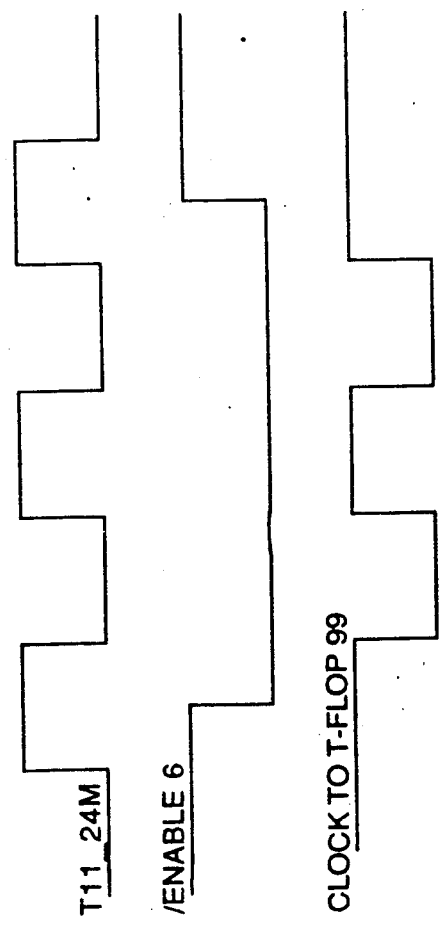
FIG. 15 shows the relative timings of certain signals input to or generated by the circuit of FIG. 14.

The eleven select signals are converted into eleven tri-state enables using the two ranks 91 and 93 of flip-flops. The first rank of flip-flops 91 is used to synchronize the selects with the phased clocks. This is necessary because the WT1-WT11 signals are generated using the T1_24M reference clock. Therefore, these signals can change anywhere between the rising edge of T1_24M and the propagation delay of the network creating these signals. This propagation delay is known to be less than the distance between the T1_24M rising edge and the T2_24M rising edge. Therefore, the signals can be captured on any of the clocks that are at least as far from the T1_24M rise as is the T2_24M rise. The second rank of flip-flops 93 is used to create the actual enable signals /Enable1-Enable11 for tri-state gates 95. The clocks for these flip-flops have been determined empirically to create an enable for each clock which lies as close as possible to the mid point between the rise and fall of the clock which the enable is enabling. FIG. 15 shows an example of the timing for /Enable6 and T11_24M.

The enables must be centered between the rising and falling edges of the clock in order to prevent an uncertainty in where the transition of the Wrdata signal occurs. The logic in Table 2 prevents there being any more than one select on at a time. Therefore, only one tri-state gate 95 can be enabled at a time making it possible to tie all the tri-state gates together. Since each enable is two clocks wide (i.e., each select is two clocks wide as mentioned above), the clock to T-flip-flop 99 will be the same as the clock which is selected, for the two clocks in which the tri-state gate is active. This will cause the Wrdata signal to transition on the first rising edge of the clock then again on the second. This then creates a Wrdata pulse which is one clock wide which is generated by the selected clock. Since the select time is two clocks wide, then the distance between consecutive /Wrclk signals must be greater than two clocks, otherwise it would be possible for two enables to turn on at the same time which would create an erroneous Wrdata pulse. This implies that the minimum distance between adjacent Wrdata pulses must be two 24 Mhz clocks or 84 ns.

OPTIONAL MODES OF OPERATION

For flexibility purposes, four signals may be brought into the controller front-end which define the polarity of the Rddata and Wrdata signals as well as define whether the signals should be pulses or toggle signals. The first two signals are called ReadPulseLow and ReadPulse. In the logic for read time detector 15, it was shown that the rising edge of the Rddata pulse is the edge which is used for detecting the transition time. This then assumes that the Rddata pulse transitions from low to high, then low again. If the ReadPulse signal is high and the ReadPulseLow signal is low, then this indicates that the Rddata signal is a positive moving pulse which is exactly what is required by the read time detector logic. If, on the other hand, the ReadPulse

| WD3 | WD2 | WD1 | WD0 | WT11 | WT10 | WT9 | WT8 | WT7 | WT6 | WT5 | WT4 | WT3 | WT2 | WT1 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 1 |
| 0 | 0 | 0 | 1 | 0 | 0 | 0 | 0 | 0 | 0 | 0 | 0 | 0 | 1 | 0 |
| 0 | 0 | 1 | 0 | 0 | 0 | 0 | 0 | 0 | 0 | 0 | 0 | 1 | 0 | 0 |
| 0 | 0 | 1 | 1 | 0 | 0 | 0 | 0 | 0 | 0 | 0 | 1 | 0 | 0 | 0 |
| 0 | 1 | 0 | 0 | 0 | 0 | 0 | 0 | 0 | 0 | 1 | 0 | 0 | 0 | 0 |
| 0 | 1 | 0 | 1 | 0 | 0 | 0 | 0 | 0 | 1 | 0 | 0 | 0 | 0 | 0 |
| 0 | 1 | 1 | 0 | 0 | 0 | 0 | 0 | 1 | 0 | 0 | 0 | 0 | 0 | 0 |
| 0 | 1 | 1 | 1 | 0 | 0 | 0 | 1 | 0 | 0 | 0 | 0 | 0 | 0 | 0 |
| 1 | 0 | 0 | 0 | 0 | 0 | 1 | 0 | 0 | 0 | 0 | 0 | 0 | 0 | 0 |
| 1 | 0 | 0 | 1 | 0 | 1 | 0 | 0 | 0 | 0 | 0 | 0 | 0 | 0 | 0 |
| 1 | 0 | 1 | 0 | 1 | 0 | 0 | 0 | 0 | 0 | 0 | 0 | 0 | 0 | 0 | signal is high and the ReadPulseLow signal is high, then this indicates that the Rddata signal is a negative moving pulse. When this condition is true, it is necessary to invert the Rddata signal in order to provide the proper polarity signal to the read time detector logic.

Figure 16:
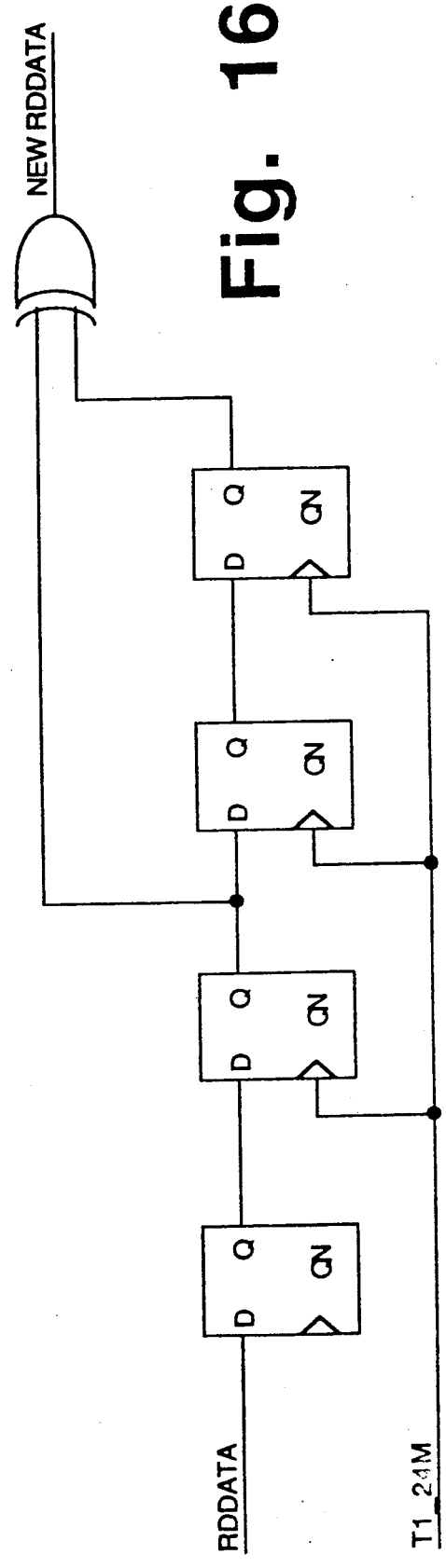
FIG. 16 is a schematic of a circuit used by the present invention in an optional mode of operation.

The final combination is if the ReadPulse signal is low. This indicates that the Rddata signal is a toggle signal where every transition from high to low or low to high is a valid transition point for doing cell time measurements. This type of Rddata signal is not often used, but when it is used, it is used for data whose cell times (distance between adjacent transitions) is in the microsecond region. Therefore, the circuit in FIG. 16 is used to transform the toggle signal into a positive moving pulse which can be used by the read time detector logic. Since the data is shifting through a set of flip-flops which clock on the T1_24M clock, all information about the precise location of the transition is lost. However, since the cell times being dealt with are in the microsecond region, it is not necessary to obtain such precise information. Rather, the only needed information is the ReadClk signal which indicates when the transition occurs.

The remaining two signals are WritePulseLow and WritePulse which are used for defining the Wrdata signal. If WritePulseLow is high and WritePulse is high then this indicates that the Wrdata signal wants to be a negative going pulse. This is achieved by initializing T-flip-flop 99 shown in FIG. 14 high, thus causing the Wrdata signal to pulse low when a clock is selected. If WritePulseLow is low and WritePulse is high, then the Wrdata signal wants to be a positive going pulse. This can be achieved by initializing the T-flip-flop to a zero. Finally, if the WritePulse signal is low, then the Wrdata signal wants to be a toggle signal which just changes states whenever a clock is selected to the T-flip-flop. This is accomplished by reducing the clock enable signals Enable1-Enable11 to one clock wide instead of two clocks wide. This will cause there to be only one rising clock edge to the T-flip-flop per enable time which makes the Wrdata change states rather than creating a pulse signal. T-flip-flop 99 is initialized based on the polarity of the WritePulseLow signal while a signal called /Wrres is low. This signal is generated by the hard disk controller logic and is brought into the chip to initialize the T-flip-flop then the WritePulseLow signal has been properly set up.

OTHER APPLICATIONS

In addition to its use as a frontend to a disk drive controller, the present invention may be used in any application where a pulse (like Rddata) asynchronous to a system clock is received and it is necessary to generate a signal indicating the distance between a particular pulse of the asynchronous signal and the system clock (i.e., a time detector) or to generate a pulse (like Wrdata) which has a specific offset from the system clock (i.e., a time generator).

Figure 17:
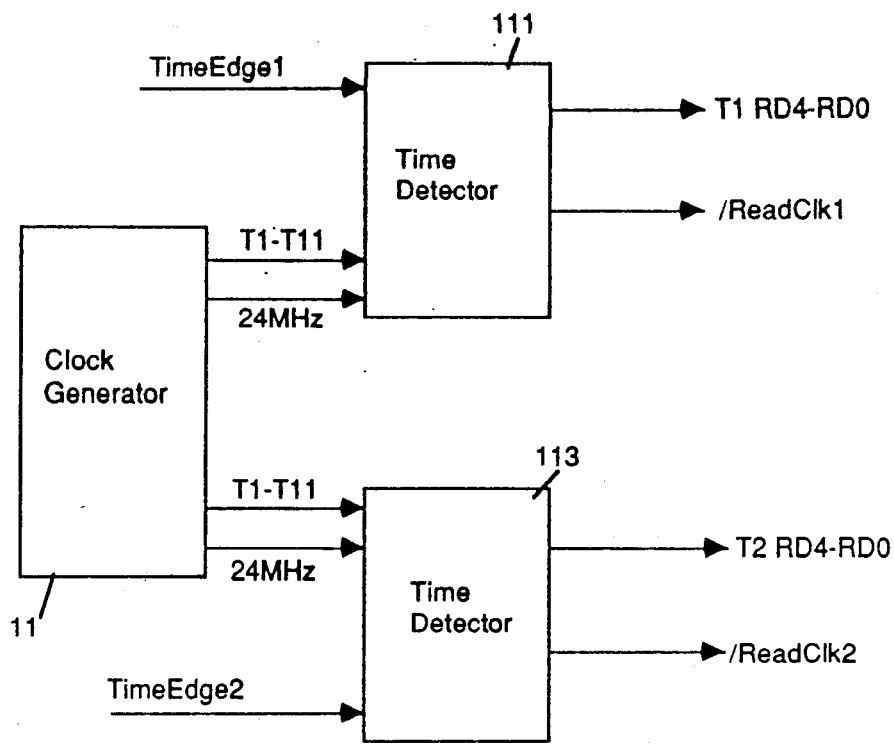
FIG. 17 is a block diagram showing the present invention being used as a time detector for a logic testing apparatus.

FIG. 17 shows an implementation of the present invention as a time detector for use in a logic testing apparatus. In particular, time detectors 111 and 113 are shown coupled to clock generator 11 which generates ring taps T1-T11 and 24 Mhz clock 31 as described above with reference to FIG. 3. Also input to time detectors 111 and 113 are two pulse signals TimeEdge1 and TimeEdge2 which are analagous to Rddata. Time detectors 111 and 113 are equivalent to Rddata time detector 15 and generate the signals T1 RD4-RD0, /ReadClk1 and T2 RD4-RD0 and ReadClk2 which respectively correspond to the signals RD4-RD0 and /ReadClk generated by Rddata time detector 15. The T1 RD4-RD0, /ReadClk1, T2 RD4-RD0 and ReadClk2 signals are then bufferd in a buffer memory and accessed by a computer to process, display and/or compare the observed data to expected data.

Figure 18:
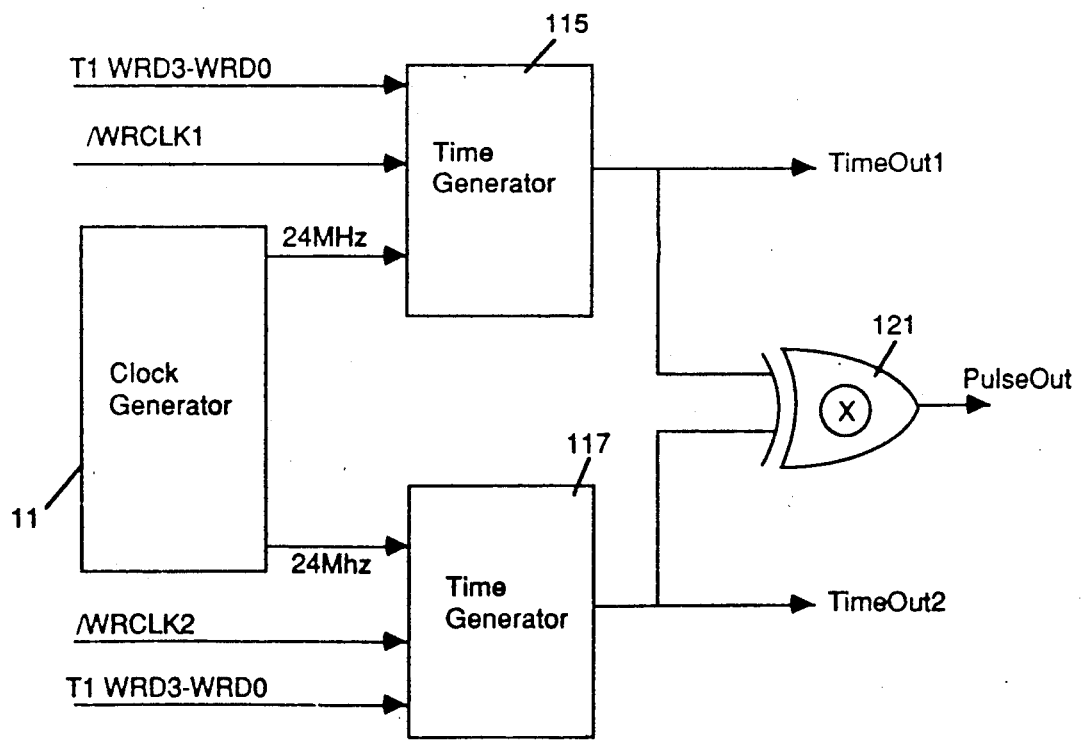
FIG. 18 is a block diagram showing the present invention being used as a time generator for a logic testing apparatus.

FIG. 18 shows an implementation of the present invention as a time generator for use in a logic testing apparatus. In particular, time generators 115 and 117 are shown coupled to clock generator 11 which generates ring taps T1-T11 and 24 Mhz clock 31 as described above with reference to FIG. 3. Also input to time generators 115 and 117 are T1 WRD3-WRD0, /WrClk1 and T2 WRD3-WRD0 and WrClk2 which respectively correspond to the signals WRD3-WRD0 and /WrClk generated by disk drive controller 8. Time generators 115 and 117 are analagous to Wrdata time generator 19 and generate the signals TimeOut1 and TimeOut2 which correspond to Wrdata generated by Wrdata time generator 19. TimeOut1 and TimeOut2 are XORed together by XOR gate 121 to generate the signal PulseOut. TimeOut1, TimeOut2 and PulseOut are output to a device or circuit under test to provide a stimulus pattern for testing and development of circuits and devices.

We claim:

1. An integrated circuit frontend for coupling to an integrated circuit hard disk drive controller, a central processing unit having a system clock, and a disk drive, said frontend generating timing signals for use by said disk controller using digital circuitry and write pulses for use by said disk drive to write data, and receiving read pulses generated by said disk drive representing read data, said frontend comprising:
   (a) clock generator means for converting a system clock signal generated by said system clock having a first frequency into a reference clock signal having a second frequency;
   (b) read data time detector means coupled to said clock generator means, said disk drive controller and said disk drive for receiving said read pulses and generating a relative read value output to said disk drive controller, said relative read value representing the location of a particular read pulse relative to said reference clock signal;
   (c) write data time generator means coupled to said clock generator, said disk drive controller and said disk drive for receiving a relative write value generated by said disk drive controller which represents the location of a particular write pulse relative to said reference clock signal and generating said write pulses output to said disk drive based upon said relative write value.

2. The circuit defined by claim 1 wherein said clock generator means comprises:
   (a) ring oscillator means for generating said reference clock signal and a plurality of tap signals separated from each other by a predetermined delay;
   (b) power supply means coupled to said ring oscillator means for controlling the frequency of the reference clock signal;
   (c) frequency lock means coupled to said system clock and said ring oscillator means for determining whether said reference clock signal is within predetermined bounds and generating signals which cause said power supply means to selectively increase or decrease the frequency of the reference clock signal so as to bring said reference clock signal within said predetermined bounds;

(d) phase lock means coupled to said system clock and said ring oscillator means for determining whether the reference clock signal, once it has been brought to within said predetermined bounds by said frequency lock means, is stabilized at said second frequency, and generating signals which cause said power supply means to selectively increase or decrease the frequency of the reference clock signal so as to lock said reference clock signal at said second frequency.

3. The circuit defined by claim 2 wherein said frequency lock means comprises:

(a) a shift counter coupled to said ring oscillator means for counting the number of rising edges of a predetermined one of said tap signals within one-half of a period of said system clock;

(b) means for generating a not too fast signal and a not too slow signal when said predetermined one of said tap signals is within approximately 20 ns of said reference clock signal.

4. The circuit defined by claim 1 wherein said clock generator means comprises:

(a) ring oscillator means for generating said reference clock signal and a plurality of tap signals separated from each other by a predetermined delay;

(b) power supply means coupled to said ring oscillator means for controlling the frequency of the reference clock signal;

(c) phase lock means coupled to said system clock and said ring oscillator means for determining whether the reference clock signal is stabilized at said second frequency, and generating signals which cause said power supply means to selectively increase or decrease the frequency of the reference clock signal so as to lock said reference clock signal at said second frequency.

5. The circuit defined by claim 4 wherein said read data time detector means comprises:

(a) a first layer of flip-flops, each having a Q output, for receiving said reference clock signal, said tap signals and a signal having the same frequency as said reference signal and 90° out of phase, said first layer of flip-flops being clocked by said read pulses;

(b) a second layer of flip-flops, each having a Q output, coupled to said Q outputs of corresponding flip-flops from said first layer, said second layer of flip-flops being clocked by one edge of said reference clock pulse;

(c) a third layer of flip-flops, each having a Q output, coupled to said Q outputs of corresponding flip-flops from said second layer, said third layer of flip-flops being clocked by a second edge of said reference clock pulse;

(d) means coupled to the Q outputs of said third layer of flip-flops for generating a number which represents the distance between said reference clock signal and a predetermined one of said read data pulses.

6. The circuit defined by claim 4 wherein said write data time generator means comprises:

(a) means for converting said relative write value to a plurality of select signals corresponding to each of said tap signals;

(b) a first layer of flip-flops, each having a Q output, each for receiving a predetermined one of said plurality of select signals, each flip-flop in said first layer of flip-flops being clocked by a predetermined one of said tap signals divided by 2;

(c) a second layer of flip-flops, each having a Q output, coupled to said Q outputs of corresponding flip-flops from said first layer, each flip-flop in said second layer of flip-flops being clocked by a predetermined one of said tap signals divided by 2;

(d) a layer of tri-state gates, coupled to said Q outputs of corresponding flip-flops from said second layer representing /Enable signals, one of said tri-state gates passing a predetermined one of said tap signals divided by 2 when its corresponding /Enable signal is active;

(e) a flip-flop coupled to said layer of tri-state gates and clocked thereby and generating said write pulses.

7. The circuit defined by claim 4 wherein said ring oscillator means comprises:

(a) a layer of inverters coupled to said power supply means for receiving a first power supply voltage from said power supply means;

(b) a first layer of buffer inverters coupled to said power supply means for receiving a second power supply voltage from said power supply means, said second power supply voltage being scaled from said first power supply voltage, and coupled to a corresponding inverter in said layer of inverters;

(c) a second layer of buffer inverters coupled to said power supply means for receiving a third power supply voltage from said power supply means, said third power supply voltage being scaled from said first power supply voltage, and coupled to a corresponding buffer inverter in said first layer of buffer inverters;

(d) a third layer of buffer inverters coupled to said power supply means for receiving a third power supply voltage from said power supply means, said third power supply voltage being scaled from said first power supply voltage, and coupled to a corresponding buffer inverter in said second layer of buffer inverters, the output from each buffer inverter in said third layer being one of said plurality of tap signals.

8. The circuit defined by claim 4 wherein said phase lock means comprises:

(a) phase clocks generating means for generating three clock signals which are each a divide by three of the reference clock signal and evenly out of phase therewith; and (b) capture logic means coupled to said phase clocks generating means and said power supply means for capturing the states of said three clock signals wherein a predetermined one of said three clock signals is phase compared to said system clock signal, and second and third ones of said three clock signals are used to determine whether said system clock has the same frequency as said predetermined one of said three clock signals and generating an EnableDown signal if the frequency of said system clock is greater than said predetermined one of said three clock signals and an /EnableUp signal if the frequency of said system clock is less than said predetermined one of said three clock signals.

9. The circuit defined by claim 8 wherein said phase clocks generating means comprises a three stage shift register.

10. The circuit defined by claim 8 wherein said power supply means comprises:
 (a) a pull-up device coupled to said capture logic means for pulling up a Control signal when said /EnableUp signal is active;
 (b) a pull-down device coupled to said capture logic means for pulling down said Control signal when said EnableDown signal is active;
 (c) a transistor network coupled to said ring oscillator means for generating first, second and third power supply voltages wherein said second and third power supply voltages are scaled from said first power supply voltage.

11. In an integrated circuit frontend for coupling to an integrated circuit hard disk controller, a central processing unit having a system clock, and a disk drive, a method for generating timing signals for use by said controller using digital circuitry and write pulses for use by said disk drive to write data, and receiving read pulses generated by said disk drive representing read data, said method comprising the steps of:
 (a) converting a system clock signal generated by said system clock having a first frequency into a reference clock signal having a second frequency;
 (b) receiving said read pulses and generating a relative read value output to said disk drive controller which represents the location of a particular read pulse relative to said reference clock signal;
 (c) receiving a relative write value generated by said disk drive controller which represents the location of a particular write pulse relative to said reference clock signal and generating said write pulses output to said disk drive based upon said relative write value.

12. The method defined by claim 11 wherein said converting step comprises the steps of:
 (a) generating said reference clock signal and a plurality of tap signals separated from each other by a predetermined delay;
 (b) controlling the frequency of the reference clock signal;
 (c) determining whether the reference clock signal, is stabilized at said second frequency, and generating signals which selectively increase or decrease the frequency of the reference clock signal so as to lock said reference clock signal at said second frequency.

13. The method defined by claim 11 wherein said converting step comprises the steps of:
 (a) generating said reference clock signal and a plurality of tap signals separated from each other by a predetermined delay;
 (b) controlling the frequency of the reference clock signal;
 (c) determining whether said reference clock signal is within predetermined bounds and generating signals which selectively increase or decrease the frequency of the reference clock signal so as to bring said reference clock signal within said predetermined bounds;
 (d) determining whether the reference clock signal, once it has been brought to within said predetermined bounds is stabilized at said second frequency, and generating signals which selectively increase or decrease the frequency of the reference clock signal so as to lock said reference clock signal at said second frequency.

14. The method defined by claim 11 wherein said receiving said read pulses step comprises the steps of:
 (a) receiving said reference clock signal, said tap signals and a signal having the same frequency as said reference signal and 90° out of phase;
 (b) using said reference clock signal and said 90° out of phase signal to generate a number which represents the distance between said reference clock signal and a predetermined one of said read data pulses.

15. The method defined by claim 13 wherein said receiving a relative write value step comprises the steps of:
 (a) converting said relative write value to a plurality of select signals corresponding to each of said tap signals;
 (b) storing a predetermined one of said plurality of select signals in a corresponding flip-flop having a Q output in a first layer of flip-flops being clocked by a predetermined one of said tap signals divided by 2;
 (c) storing one of said Q outputs in a corresponding flip-flop in a second layer of flip-flops, each having a Q output representing /Enable signals, each flip-flop in said second layer of flip-flops being clocked by a predetermined one of said tap signals divided by 2;
 (d) inputting one of said Q outputs from a corresponding flip-flop in said second layer of flip-flops to a corresponding tri-state gate in a layer of tri-state gates, one of said tri-state gates passing a predetermined one of said tap signals divided by 2 when its corresponding /Enable signal is active;
 (e) clocking a flip-flop coupled to said layer of tri-state gates using said passed predetermined one of said tap signals divided by 2 to thereby generate said write pulses.

16. An integrated time measurement and generation circuit for coupling to a central processing unit having a system clock and a source of asynchronous pulses, said circuit comprising:
 (a) clock generator means for converting a system clock signal generated by said system clock having a first frequency into a reference clock signal having a second frequency; wherein said clock generator means comprises:
  (i) ring oscillator means for generating said reference clock signal and a plurality of tap signals separated from each other by a predetermined delay;
  (ii) power supply means coupled to said ring oscillator means for controlling the frequency of the reference clock signal;
  (iii) phase lock means coupled to said system clock and said ring oscillator means for determining whether the reference clock signal is stabilized at said second frequency, and generating signals which cause said power supply means to selectively increase or decrease the frequency of the reference clock signal so as to lock said reference clock signal at said second frequency; and
 (b) at least one read data time detector means coupled to said clock generator means and said source of asynchronous pulses for receiving said asynchronous pulses and generating a relative read value which represents the location of a particular asynchronous pulse relative to said reference clock signal.

17. The circuit defined by claim 16 wherein said clock generator means comprises:
 (a) ring oscillator means for generating said reference clock signal and a plurality of tap signals separated from each other by a predetermined delay;
 (b) power supply means coupled to said ring oscillator means for controlling the frequency of the reference clock signal;
 (c) frequency lock means coupled to said system clock and said ring oscillator means for determining whether said reference clock signal is within predetermined bounds and generating signals which cause said power supply means to selectively increase or decrease the frequency of the reference clock signal so as to bring said reference clock signal within said predetermined bounds;
 (d) phase lock means coupled to said system clock and said ring oscillator means for determining whether the reference clock signal, once it has been brought to within said predetermined bounds by said frequency lock means, is stabilized at said second frequency, and generating signals which cause said power supply means to selectively increase or decrease the frequency of the reference clock signal so as to lock said reference clock signal at said second frequency.

18. The circuit defined by claim 16 wherein said read data time detector means comprises:
 (a) a first layer of flip-flops, each having a Q output, for receiving said reference clock signal, said tap signals and a signal having the same frequency as said reference signal and 90° out of phase, said first layer of flip-flops being clocked by said asynchronous pulses;
 (b) a second layer of flip-flops, each having a Q output, coupled to said Q outputs of corresponding flip-flops from said first layer, said second layer of flip-flops being clocked by one edge of said reference clock pulse;
 (c) a third layer of flip-flops, each having a Q output, coupled to said Q outputs of corresponding flip-flops from said second layer, said third layer of flip-flops being clocked by a second edge of said reference clock pulse;
 (d) means coupled to the Q outputs of said third layer of flip-flops for generating a number which represents the distance between said reference clock signal and a predetermined one of said asynchronous pulses.

19. An integrated time measurement and generation circuit for coupling to a central processing unit having a system clock and a destination, said destination inputting asynchronous pulses, said circuit comprising:
 (a) clock generator means for converting a system clock signal generated by said system clock having a first frequency into a reference clock signal having a second frequency;
 wherein said clock generator means comprises:
  (i) ring oscillator means for generating said reference clock signal and a plurality of tap signals separated from each other by a predetermined delay;
  (ii) power supply means coupled to said ring oscillator means for controlling the frequency of the reference clock signal;
  (iii) phase lock means coupled to said system clock and said ring oscillator means for determining whether the reference clock signal is stabilized at said second frequency, and generating signals which cause said power supply means to selectively increase or decrease the frequency of the reference clock signal so as to lock said reference clock signal at said second frequency; and
 (b) at least one write data time generator means coupled to said clock generator and said central processing unit for receiving a relative write value generated by said central processing unit which represents the location of a particular asynchronous pulse relative to said reference clock signal and generating said asynchronous pulse based upon said relative write value.

20. The circuit defined by claim 19 wherein said clock generator means comprises:
 (a) ring oscillator means for generating said reference clock signal and a plurality of tap signals separated from each other by a predetermined delay;
 (b) power supply means coupled to said ring oscillator means for controlling the frequency of the reference clock signal;
 (c) frequency lock means coupled to said system clock and said ring oscillator means for determining whether said reference clock signal is within predetermined bounds and generating signals which cause said power supply means to selectively increase or decrease the frequency of the reference clock signal so as to bring said reference clock signal within said predetermined bounds;
 (d) phase lock means coupled to said system clock and said ring oscillator means for determining whether the reference clock signal, once it has been brought to within said predetermined bounds by said frequency lock means, is stabilized at said second frequency, and generating signals which cause said power supply means to selectively increase or decrease the frequency of the reference clock signal so as to lock said reference clock signal at said second frequency.

21. The circuit defined by claim 19 wherein said write data time generator means comprises:
 (a) means for converting said relative write value to a plurality of select signals corresponding to each of said tap signals;
 (a) a first layer of flip-flops, each having a Q output, each for receiving a predetermined one of said plurality of select signals, each flip-flop in said first layer of flip-flops being clocked by a predetermined one of said tap signals divided by 2;
 (b) a second layer of flip-flops, each having a Q output, coupled to said Q outputs of corresponding flip-flops from said first layer, each flip-flop in said second layer of flip-flops being clocked by a predetermined one of said tap signals divided by 2;
 (c) a layer of tri-state gates, coupled to said Q outputs of corresponding flip-flops from said second layer representing /Enable signals, one of said tri-state gates passing a predetermined one of said tap signals divided by 2 when its corresponding /Enable signal is active;
 (d) a flip-flop coupled to said layer of tri-state gates and clocked thereby and generating said write pulses.

22. In an integrated time measurement and generation circuit for coupling to a central processing unit having a system clock and a source of asynchronous pulses, a method for generating timing signals for measuring the time distance between adjacent asynchronous pulses comprising the steps of:

(a) converting a system clock signal generated by said system clock having a first frequency into a reference clock signal having a second frequency;
wherein said converting step comprises the steps of:
  (i) generating said reference clock signal and a plurality of tap signals separated from each other by a predetermined delay;
  (ii) determining whether the reference clock signal is stabilized at said second frequency, and generating signals to selectively increase or decrease the frequency of the reference clock signal so as to lock said reference clock signal at said second frequency; and
(b) receiving said asynchronous pulses and generating a relative read value which represents the location of a particular asynchronous pulse relative to said reference clock signal.

23. The method defined by claim 22 wherein said converting step comprises the steps of
(a) generating said reference clock signal and a plurality of tap signals separated from each other by a predetermined delay;
(b) determining whether said reference clock signal is within predetermined bounds and generating signals to selectively increase or decrease the frequency of the reference clock signal so as to bring said reference clock signal within said predetermined bounds;
(c) determining whether the reference clock signal, once it has been brought to within said predetermined bounds by said frequency lock means, is stabilized at said second frequency, and generating signals which selectively increase or decrease the frequency of the reference clock signal so as to lock said reference clock signal at said second frequency.

24. The method defined by claim 22 wherein said receiving said asynchronous pulses step comprises the steps of:
(a) receiving said reference clock signal, said tap signals and a signal having the same frequency as said reference signal and 90° out of phase;
(b) using said reference clock signal and said 90° out of phase signal to generate a number which represents the distance between said reference clock signal and a predetermined one of said asynchronous pulses.

25. In an integrated time measurement and generation circuit for coupling to a central processing unit having a system clock and a destination which receives asynchronous pulses, a method for generating said asynchronous pulses based upon a relative write value generated by said central processing unit comprising the steps of:
(a) converting a system clock signal generated by said system clock having a first frequency into a reference clock signal having a second frequency;
wherein said converting step comprises the steps of:
  (i) generating said reference clock signal and a plurality of tap signals separated from each other by a predetermined delay;
  (ii) determining whether the reference clock signal is stabilized at said second frequency, and generating signals to selectively increase or decrease the frequency of the reference clock signal so as to lock said reference clock signal at said second frequency; and
(b) receiving said relative write value generated by said central processing unit which represents the location of a particular asynchronous pulse relative to said reference clock signal and generating said asynchronous pulse based upon said relative write value.

26. The method defined by claim 25 wherein said converting step comprises the steps of
(a) generating said reference clock signal and a plurality of tap signals separated from each other by a predetermined delay;
(b) determining whether said reference clock signal is within predetermined bounds and generating signals to selectively increase or decrease the frequency of the reference clock signal so as to bring said reference clock signal within said predetermined bounds;
(c) determining whether the reference clock signal, once it has been brought to within said predetermined bounds by said frequency lock means, is stabilized at said second frequency, and generating signals which selectively increase or decrease the frequency of the reference clock signal so as to lock said reference clock signal at said second frequency.

27. The method defined by claim 25 wherein said write value receiving step comprises the steps of:
(a) converting said relative write value to a plurality of select signals corresponding to each of said tap signals;
(b) storing a predetermined one of said plurality of select signals in a corresponding flip-flop having a Q output in a first layer of flip-flops being clocked by a predetermined one of said tap signals divided by 2;
(c) storing one of said Q outputs in a corresponding flip-flop in a second layer of flip-flops, each having a Q output representing /Enable signals, each flip-flop in said second layer of flip-flops being clocked by a predetermined one of said tap signals divided by 2;
(d) inputting one of said Q outputs from a corresponding flip-flop in said second layer of flip-flops to a corresponding tri-state gate in a layer of tri-state gates, one of said tri-state gates passing a predetermined one of said tap signals divided by 2 when its corresponding /Enable signal is active;
(e) clocking a flip-flop coupled to said layer of tri-state gates using said passed predetermined one of said tap signals divided by 2 to thereby generate said asynchronous pulses.

* * * * *

UNITED STATES PATENT AND TRADEMARK OFFICE
CERTIFICATE OF CORRECTION

PATENT NO.    : 5,047,967
DATED         : 9/10/91
INVENTOR(S)   : Sander et al.

It is certified that error appears in the above-identified patent and that said Letters Patent is hereby corrected as shown below:

| | | |
|---|---|---|
| col. 02, line 33 | delete "DETAILIED" | insert --DETAILED-- |
| col. 06, line 14 | delete "to" | insert --too-- |
| col. 07, line 59 | delete "the" (first occurrence) | |
| col. 09, line 28 | after "possible" | insert --to-- |
| col. 12, line 05 | delete "bufferd" | insert --buffered-- |
| col. 02, line 15 | delete "RDO" | insert --RD0-- |
| col. 08, line 32 | after "T-flip-flop" | insert --59-- |

Signed and Sealed this

Twenty-second Day of June, 1993

Attest:

MICHAEL K. KIRK

Attesting Officer

Acting Commissioner of Patents and Trademarks